United States Patent
Dammann et al.

(10) Patent No.: US 12,428,770 B2
(45) Date of Patent: Sep. 30, 2025

(54) DAMPER ASSEMBLY AND MACHINE FOR SUCH A DAMPER ASSEMBLY

(71) Applicant: SUSPA GmbH, Altdorf (DE)

(72) Inventors: Thorsten Dammann, Leinburg (DE); Andreas Pelczer, Altdorf (DE); Michael Weder, Nuremberg (DE)

(73) Assignee: SUSPA GMBH, Altdorf (DE)

( * ) Notice: Subject to any disclaimer, the term of this patent is extended or adjusted under 35 U.S.C. 154(b) by 326 days.

(21) Appl. No.: 17/924,175

(22) PCT Filed: May 20, 2021

(86) PCT No.: PCT/EP2021/063402
§ 371 (c)(1),
(2) Date: Nov. 9, 2022

(87) PCT Pub. No.: WO2021/239551
PCT Pub. Date: Dec. 2, 2021

(65) Prior Publication Data
US 2023/0193547 A1    Jun. 22, 2023

(30) Foreign Application Priority Data
May 28, 2020 (DE) .................... 10 2020 206 722.8

(51) Int. Cl.
*D06F 37/22* (2006.01)
*D06F 34/16* (2020.01)
(Continued)

(52) U.S. Cl.
CPC .............. *D06F 37/22* (2013.01); *D06F 34/16* (2020.02); *D06F 34/20* (2020.02); *D06F 37/268* (2013.01); *D06F 2103/26* (2020.02)

(58) Field of Classification Search
CPC .......... D06F 34/16; D06F 34/20; D06F 37/22; D06F 37/268; D06F 2103/26
See application file for complete search history.

(56) References Cited

U.S. PATENT DOCUMENTS 5,080,204 A * 1/1992 Bauer ............... F16F 7/09
                                                  68/23.1
5,382,373 A   1/1995 Carlson et al.
(Continued)

FOREIGN PATENT DOCUMENTS

CN    101037840 A    9/2007
CN    103982585 A    8/2014
(Continued)

OTHER PUBLICATIONS

Machine translation of DE 3016915 A1 to Bauer et al. (Year: 1981).*

*Primary Examiner* — Joseph L. Perrin
(74) *Attorney, Agent, or Firm* — McGlew and Tuttle, P.C.

(57) ABSTRACT

A damper assembly, in particular for a washing machine, comprises at least one damper which causes a damping effect, in particular an active damper, which can be arranged between two components of the washing machine which are movable relative to one another and can each be connected thereto, a regulation unit which is in signal communication with the damper and is intended to regulate the damping effect of the damper, at least one determination unit, which is in signal communication with the regulation unit, for determining at least one input variable, wherein the regulation unit is designed to transmit a regulation signal to the damper in dependence on the at least one input variable, the damper is designed to variably define its damping effect in dependence on the regulation signal. In addition to the at least one active damper, at least one passive damper can be provided.

33 Claims, 20 Drawing Sheets

(51) Int. Cl.
*D06F 34/20* (2020.01)
*D06F 37/26* (2006.01)
*D06F 103/26* (2020.01)

(56) References Cited

U.S. PATENT DOCUMENTS

| | | | |
|---|---|---|---|
| 5,578,232 A | 11/1996 | Engelke | |
| 6,151,930 A * | 11/2000 | Carlson | F16F 7/09 68/12.14 |
| 2005/0211517 A1* | 9/2005 | Carlson | F16F 7/082 188/267 |
| 2007/0283511 A1* | 12/2007 | Pelczer | D06F 34/18 8/158 |
| 2008/0256986 A1 | 10/2008 | Ackermann et al. | |
| 2011/0113832 A1 | 5/2011 | Ackermann et al. | |
| 2012/0011661 A1* | 1/2012 | Wauer | D06F 33/48 68/12.06 |
| 2013/0014545 A1* | 1/2013 | Ushijima | D06F 37/22 68/13 R |
| 2013/0098718 A1 | 4/2013 | Kanioz | |
| 2013/0206524 A1* | 8/2013 | Bohrer | F16F 9/36 188/317 |
| 2017/0321776 A1* | 11/2017 | Bauer | F16F 7/09 |
| 2017/0350467 A1* | 12/2017 | Böhrer | F16F 9/062 |
| 2018/0163808 A1* | 6/2018 | Bauer | F16F 7/095 |
| 2018/0231089 A1* | 8/2018 | Bauer | D06F 37/20 |
| 2019/0055687 A1* | 2/2019 | Deshpande | D06F 37/20 |

FOREIGN PATENT DOCUMENTS

| | | |
|---|---|---|
| DE | 3016915 A1 | 11/1981 |
| DE | 69829686 T2 | 9/2005 |
| DE | 102005032499 A1 | 3/2006 |
| DE | 102011080962 A1 | 2/2013 |
| DE | 102012215044 A1 | 2/2014 |
| DE | 102016207809 A1 | 11/2017 |
| DE | 102016225036 A1 | 6/2018 |
| DE | 102018211769 A1 | 1/2020 |
| DE | 102020202348 A1 | 8/2021 |
| EP | 3252338 A1 | 12/2017 |
| JP | H04371194 A | 12/1992 |
| KR | 101952645 B1 | 2/2019 |
| WO | 9922162 A1 | 5/1999 |

* cited by examiner

DAMPER ASSEMBLY AND MACHINE FOR SUCH A DAMPER ASSEMBLY

CROSS-REFERENCES TO RELATED APPLICATIONS

This application is a United States National Phase Application of International Application PCT/EP2021/063402, filed May 20, 2021. This application claims the priority of German Patent Application, Serial No. DE 10 2020 206 722.8, filed May 28, 2020, the content of which is incorporated herein by reference in its entirety as if fully set forth herein.

FIELD OF THE INVENTION

The invention relates to a damper assembly and to a machine, in particular a washing machine, having such a damper assembly.

BACKGROUND OF THE INVENTION

In machines with components that are movable relative to one another, it may be necessary to dampen the relative movement of the components. Dampers can be used for this purpose.

SUMMARY OF THE INVENTION

It is an object of the invention to improve the damping of the relative movement of two components in a machine that are movable relative to one another and, in particular, to extend the possibilities for influencing a damping effect.

The object is achieved by a damper assembly, in particular for a washing machine, comprising at least one damper, which causes a damping effect, said at least one damper can be arranged between two components of the washing machine that are movable relative to one another, and can each be connected thereto, a regulation unit that is in signal communication with the damper to regulate the damping effect of the damper, at least one determination unit that is in signal communication with the regulation unit for determining at least one input variable, wherein the regulation unit is designed to transmit a regulation signal to the damper in dependence on the at least one input variable, the damper is designed to variably determine its damping effect in dependence on the regulation signal and a machine, in particular a washing machine, having a first component, in particular a housing, in particular a washing machine housing, a second component, in particular an element, in particular a washing tub, which is mounted in the housing such as to oscillate, wherein a laundry drum is arranged in particular in the washing tub, which laundry drum is mounted such that it can rotate about an axis of rotation, wherein the second component is displaceable relative to the first component, in particular is rotatable about an axis of rotation, a damper assembly according to the invention, wherein the at least one damper is connected to the first component and to the second component. The core of the invention is that a damper assembly has a regulation unit which is in signal communication with a damper. The damper, which can be arranged between two components that are movable relative to one another, in particular components of a washing machine, and can be connected thereto in each case, causes a damping effect. The regulation unit serves to regulate the damping effect of the damper. The regulation unit can be arranged externally to the damper or integrated in the damper.

Furthermore, the damper assembly comprises a determination unit that is in signal communication with the regulation unit for determining at least one input variable. The determination unit can be arranged externally to the damper or integrated in the damper. The regulation unit is designed to transmit a regulation signal to the damper in dependence on the at least one input variable. The damper is designed so that its damping effect can be variably defined in dependence on the regulation signal. The variable determination of the damping effect is in particular active. The damper is in particular an active damper. The damping effect can be, for example, frictional damping or hydraulic damping.

An active damper is, for example, a friction damper with a freewheel function that can be switched. Such a switchable damper has a switching unit that can be switched between a locking arrangement and a freewheel arrangement. In the locking arrangement, a displacement of the friction lining in the housing of the damper is blocked. In the freewheel arrangement, an axial displacement of the friction lining in the housing is possible. Such a damper is known from DE 10 2016 207 809 A1, to which reference is hereby made.

An active damper may be designed as a friction damper in which the friction force, i.e. the damping effect, can be variably adjusted. At least one friction lining is attached to a friction lining carrier. By means of an adjusting member, the at least one friction lining can be adjustably arranged at the friction lining carrier and, in particular, pressed with a variable contact force against a corresponding friction partner, in particular the inner wall of a damper housing. Depending on the contact force of the at least one friction lining, the damping effect varies. A damper of this type is known from DE 10 2016 225 036 A1, to which reference is hereby made.

An active damper can also be a friction damper with a friction unit that generates a directional friction force on an axially displaceable plunger. The plunger is displaceable in the housing of the friction damper. The friction unit has at least one friction lining which bears frictionally against the plunger. The friction force can be variably determined by means of a switching unit. In particular, the switching unit serves to lock a tiltability of a friction lining carrier, wherein friction forces of different amounts act on the plunger in different tilt positions of the friction lining carrier. A friction damper of this type is known from DE 10 2020 202 348.4, to which reference is hereby made.

An active damper can also be formed due to the fact that in a friction damper, the axial limitation of the displaceability of a friction lining can be variably adjusted. This can be done, for example, by means of at least one axially displaceable freewheel stop. A friction damper of this type has a variably adjustable freewheel length. The at least one freewheel stop can, for example, be driven by a motor, in particular by an electric motor, wherein the electric motor is arranged, for example, parallel to the longitudinal axis of the friction damper on an outer side of the housing of the friction damper. The rotary motion of the electric motor is transmitted, in particular via a gearwheel connection, to a rotary link which has helical recesses and/or grooves along the outer circumference. Axially oriented adjusting levers are guided in these recesses and/or grooves and are connected to the freewheel stop. The adjusting levers and thus the at least one freewheel stop, are axially adjusted by a rotary movement of the rotary link. The freewheel length of the friction damper is changed as a result.

An active damper can also be provided by a friction damper in which the friction lining includes a foamed plastic that is impregnated with a magneto-rheological fluid. The frictional properties, in particular the damping effect of such a damper, can be adjusted by electromagnetic fields interacting with the magneto-rheological fluid, in a targeted manner. A damper of this type is known from WO 99/22162 A1, to which reference is hereby made.

An active damper can also be a hydraulic damper in which a damping effect is achieved by a damping fluid flowing through an integrated throttle channel. The integrated throttle channel forms a fluid-throttle connection. The throttle channel has a flow cross-sectional area and a throttle channel length that affect the damping effect. In the active damper, the length and/or the cross-sectional area can be variably adjusted.

The regulation unit is in particular independent of a machine control of the machine, in particular of the washing machine.

The damping effect can be defined in steps, i.e. in discrete damping effect steps, and/or continuously with a continuous damping effect progress.

A damper assembly in a washing machine is particularly advantageous. However, the damper assembly according to the invention is also suitable for other machines, in particular in the field of mechanical engineering, such as paint mixers in DIY stores, specialized paint traders and/or paint shops, and/or for horizontal or vertical centrifuges and other rotating machines which may have an imbalance so that the resonant frequency of the system can be passed through during operation, in order to dampen the relative movement of two components that are movable with respect to one another.

The design of the damper as a friction damper which in particular has a housing, a plunger that is displaceable relative thereto and/or a friction unit for generating a friction force ensures a robust damper assembly and efficient provision of the damping effect. This damper assembly is particularly suitable for washing machines. In particular, the friction damper has a friction unit which serves to generate a friction force. The friction force in particular counteracts a relative movement between a housing and/or a plunger of the friction damper.

The embodiment of the friction unit to be variably adjustable for generating a variably adjustable friction force enables an active, in particular direct, variable adjustment of the friction force. For this purpose, the friction unit may have a freewheel function that can be activated or deactivated and/or actively changed, i.e. actively adjusted. The damping effect of the damper assembly is changed when the freewheel function is activated or not. Freewheel means that for a fixed displacement path of the plunger, the so-called free lift, no or at most a small friction force is generated by the friction damper relative to the housing of the friction damper. When the free lift is exceeded, the friction unit generates a higher friction force. It is also conceivable that the amount of the free lift can be set to be variable, staged or continuous.

Additionally or alternatively, it is possible that the friction unit is designed to be able to variably adjust the friction force, in particular the amount of the friction force. This can be done, for example, by the friction unit having at least one friction lining, which bears against at least one of the movable components of the friction damper, i.e. the housing and/or the plunger, is pressed against with a variably adjustable contact force. As a result, the friction force generated by the friction unit, in particular the friction lining, is adjustable.

The embodiment of the damper as a hydraulic damper which has, in particular, a variably adjustable throttle valve enables a direct change of a throttle function, in particular by means of a variably adjustable throttle valve. In particular, the throttle valve enables a change in a cross-sectional area and/or a length of a throttle channel of the throttle valve.

It is also conceivable to design the damper as a piston-housing unit with a housing and a piston displaceable relative thereto, wherein the piston can in particular have a carrier material with a magneto-rheological fluid. The housing may have at least one electromagnetic coil, wherein the damping effect, i.e. the force counteracting the movement between the piston and the housing, is variably adjustable by a change in the electric field of the electromagnetic coil in the housing.

A damper assembly configured such that the at least one determination unit has at least one damper-external sensor for determining a vibration behavior of the components that are movable relative to one another enables a straightforward design of the damper itself. The determination of the at least one input variable is possible independently of the damper. In particular, it is possible to use sensors that are already present in the machine anyway, in particular the washing machine. In particular, the damper assembly enables frequency-dependent regulation, in particular by determining changes in direction of the components that are movable relative to one another, in particular by an acceleration sensor, by a light barrier and/or by a displacement measurement.

The embodiment of the determination unit to be in signal communication with a drive motor, which can drive at least one of the components that are movable relative to one another, for determining a characteristic variable, in particular the performance, the current and/or the rotational speed of the drive motor is possible without additional sensors. A characteristic variable of a drive motor, in particular an electric motor, which drives the laundry drum of the washing machine, serves as an input variable for the regulation unit. In particular, the prevailing motor performance, in particular the prevailing motor current, in particular the changes in the motor current over time, can be used as a characteristic variable to identify an imbalance of the laundry drum. Additionally or alternatively, the rotational speed signal, in particular the change in rotational speed over time, of the electric motor can be used for imbalance determination.

In addition or alternatively, the determination unit having at least one sensor, in particular integrated in the damper, for determining a movement and/or the occurring forces of at least one damper component, in particular a housing, a plunger that is displaceable relative thereto and/or a friction unit may include a sensor which is in particular integrated in the damper. A sensor of this type can be a magnetic displacement sensor, an optical sensor and/or a flow rate sensor in the case of a hydraulic damper. The sensor serves in particular to determine a movement of at least one damper component, in particular the housing, the plunger that can be displaced relative thereto and/or the friction unit.

A damper assembly configured such that the damper has a, in particular integrated, transport securing device, which is formed in particular by fixing a minimum damping effect and/or which has in particular a locking member in order to lock the mobility of the damper, enables a simplified embodiment of the machine, in particular the washing machine. Due to the fact that the damper itself has a transport securing device, in particular an integrated transport securing device, an otherwise usual transport securing device for the washing machine is dispensable. The transport securing device of the damper can be designed by fixing a minimum damping effect, i.e. force-fitting, so that it is reliably ensured that relative movements, in particular of the washing machine tub in the housing of the washing machine, are excluded. Additionally or alternatively, the transport securing device of the damper can have a locking member to lock the mobility of the damper and thus the mobility of the washing machine tub in the housing. In this case, the transport securing device is of a form-fit design. Such locking would also be possible by reducing the flow cross-sectional area of a hydraulic damper to zero, i.e. closing it.

A damper assembly having the emergency energy unit for providing power in an emergency condition ensures a reliable and in particular risk-free operation of a machine with the damper assembly in an emergency state, i.e. in particular when the machine and/or the damper assembly are de-energized, i.e. in particular when standard energy is no longer available, where applicable also only temporarily. The emergency energy unit comprises in particular a drive which can drive at least one of the components that are movable relative to one another, which drive is designed in particular as an electric motor and can be used as a generator in the emergency state. The emergency energy unit may also comprise an induction unit for inducing electric current, in particular a coil and a magnet that are attached to damper components. The emergency power unit may also include an accumulator or other type of battery unit and/or an electrical capacitor. The emergency energy unit can also have a mechanical energy storage unit, in particular a pretensioned spring member, in particular a pretensioned diaphragm spring or a pretensioned helical spring, and/or an independent, self-sufficient, available fluid pressure, in particular in the form of a pressure vessel under fluid pressure, which is in particular filled with water, gas and/or hydraulic medium. A corresponding supply line for water, gas, air, a hydraulic medium or another fluid can also serve as a pressure source.

A machine, in particular a washing machine, having first component, in particular a housing, in particular a washing machine housing, a second component, in particular an element, in particular a washing tub, which is mounted in the housing such as to oscillate, wherein a laundry drum is arranged in particular in the washing tub, which laundry drum is mounted such that it can rotate about an axis of rotation, wherein the second component is displaceable relative to the first component, in particular is rotatable about an axis of rotation, a damper assembly according to the invention, wherein the at least one damper is connected to the first component and to the second component has substantially the advantages of the damper assembly, to which reference is hereby made. The machine has a first and a second component which are displaceable relative to one another, wherein the second component is in particular rotatable about an axis of rotation. In the machine, the at least one damper is connected to, in particular attached to, the first component and to the second component.

The at least one damper is an active damper according to the patent application. A plurality of active dampers may be provided with the machine. In addition to the at least one active damper, at least one passive damper may also be provided, which is appropriately attached to the components. In particular, a plurality of passive dampers may also be provided. In contrast to the active dampers, a variable determination of the damping effect is not possible for the passive dampers. Passive dampers in the sense of the invention are per se known standard, freewheel, spring-piston, hydraulic and/or air dampers and/or suspension struts.

A machine configured such that the at least one damper is fastened with a first end to a bottom side facing a bottom element of the first component and with a second end to the bottom element and/or a side element that is adjacent to the bottom element enables an advantageous arrangement of the at least one damper, in particular in a washing machine, in that the at least one damper supports the second component, which is in particular suspended in an oscillating manner, on its underside. The underside is understood to be the region on an outer side of the second component, the normal vector of which has a vertical component downwards. The second component is in particular the washing tub in the washing machine.

Additionally or alternatively, in a machine configured such that the at least one damper is fastened with a first end to an upper side facing a cover element of the first component and with a second end to the cover element and/or a side element that is adjacent to the cover element, the at least one damper may be hinged to an upper side of the second component. Upper side is understood to mean the region on an outer side of the second component, the normal vector of which has an upward vertical component. In particular, the second component is hinged to the at least one damper.

A machine configured such that the at least one damper is fastened with a first end to an outer side of the washing tub oriented parallel to the axis of rotation of the laundry drum or to an end face of the washing tub oriented perpendicular to the axis of rotation of the laundry drum enables a reliable damping of vibrations, in particular due to imbalance of the laundry drum, i.e. in the radial direction with respect to the axis of rotation of the laundry drum and/or in the axial direction of the axis of rotation.

A machine configured such that the damper assembly has at least two, in particular at least three, in particular at least four, in particular at least five, in particular at least six, in particular at least seven, in particular at least eight, dampers, wherein in particular at least one damper is designed as an active damper ensures a sufficient number of dampers to reliably dampen the relative motion of the components.

Assemblies of the dampers in machines configured such that the dampers are arranged at a distance from one another along a longitudinal direction oriented parallel to the axis of rotation of the laundry drum and configured such that the dampers are arranged at a distance from one another in the circumferential direction with respect to the axis of rotation of the laundry drum ensure a reliable motion damping in all spatial directions.

Both the features indicated in the patent claims and the features indicated in the following embodiments of a damper arrangement according to the invention are each suitable, either on their own or in combination with one another, for further developing the subject matter according to the invention. The respective combinations of features do not represent any restrictions with regard to further embodiments of the subject matter of the invention, but are essentially merely exemplary in character.

Further features, advantages and details of the invention will be apparent from the following description of embodiments based on the drawing.

BRIEF DESCRIPTION OF THE DRAWING

FIG. 23 shows a longitudinal section of a damper in the form of a hydraulic damper according to a further embodiment having an extended piston rod, FIG. 24 shows an illustration corresponding to FIG. 23 having the piston rod pushed in.

DESCRIPTION OF THE PREFERRED EMBODIMENT

Figure 1:
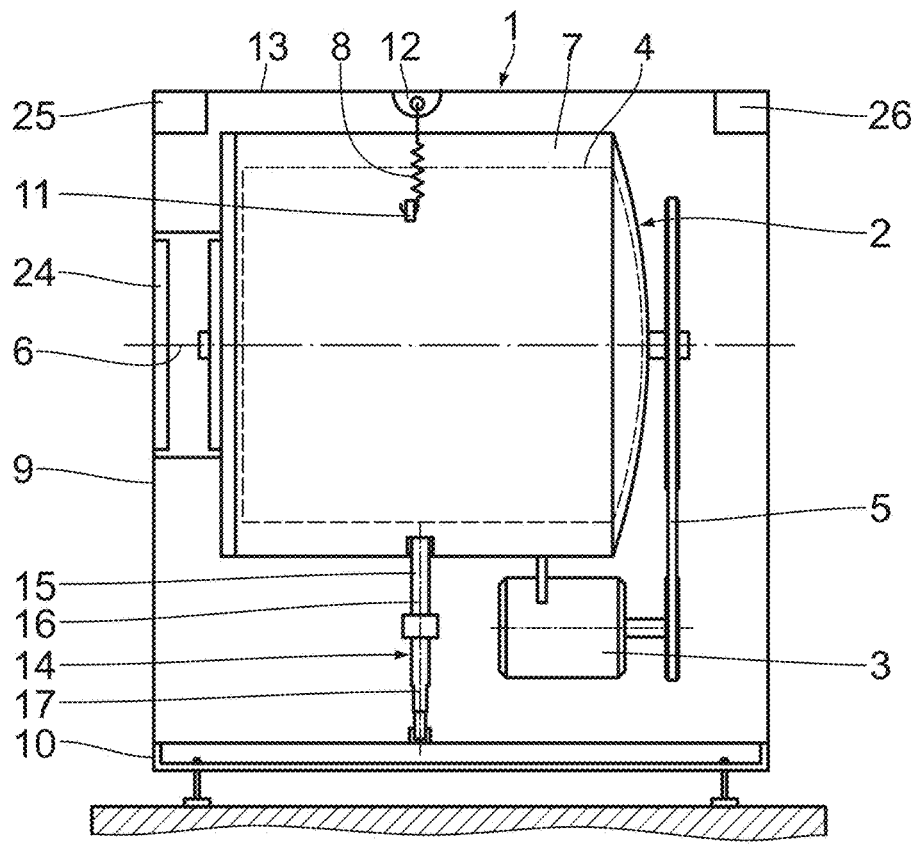
FIG. 1 shows a washing machine having a damper assembly according to the invention in a schematic side view.
Figure 2:
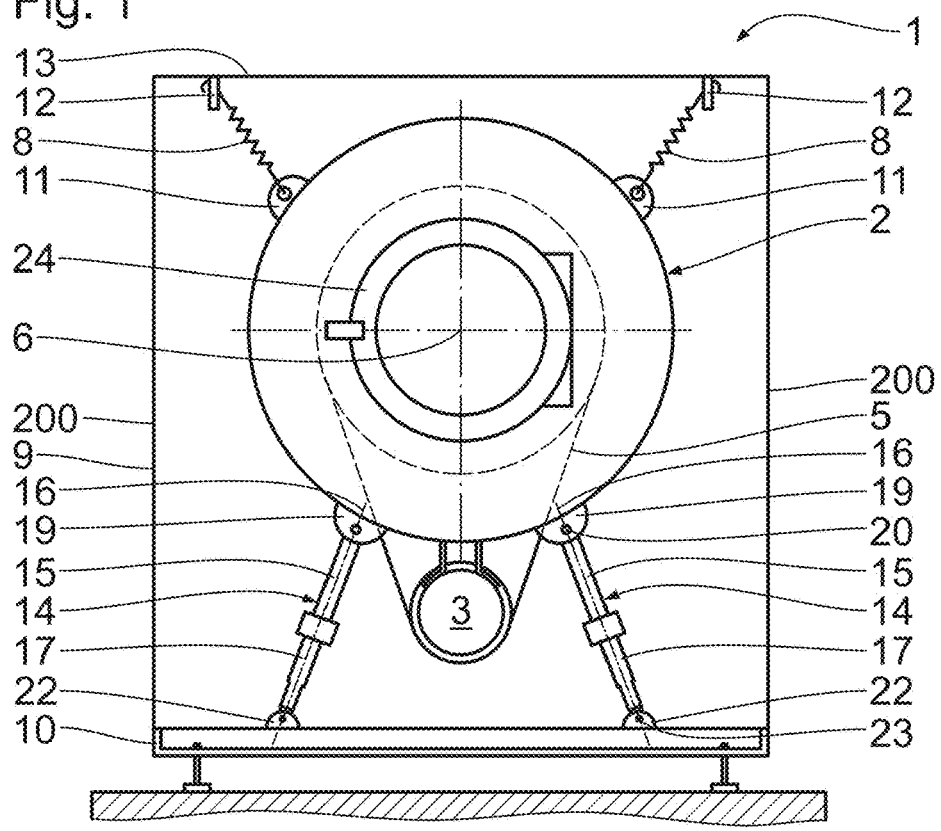
FIG. 2 shows a front view of the washing machine according to FIG. 1.
Figure 3:
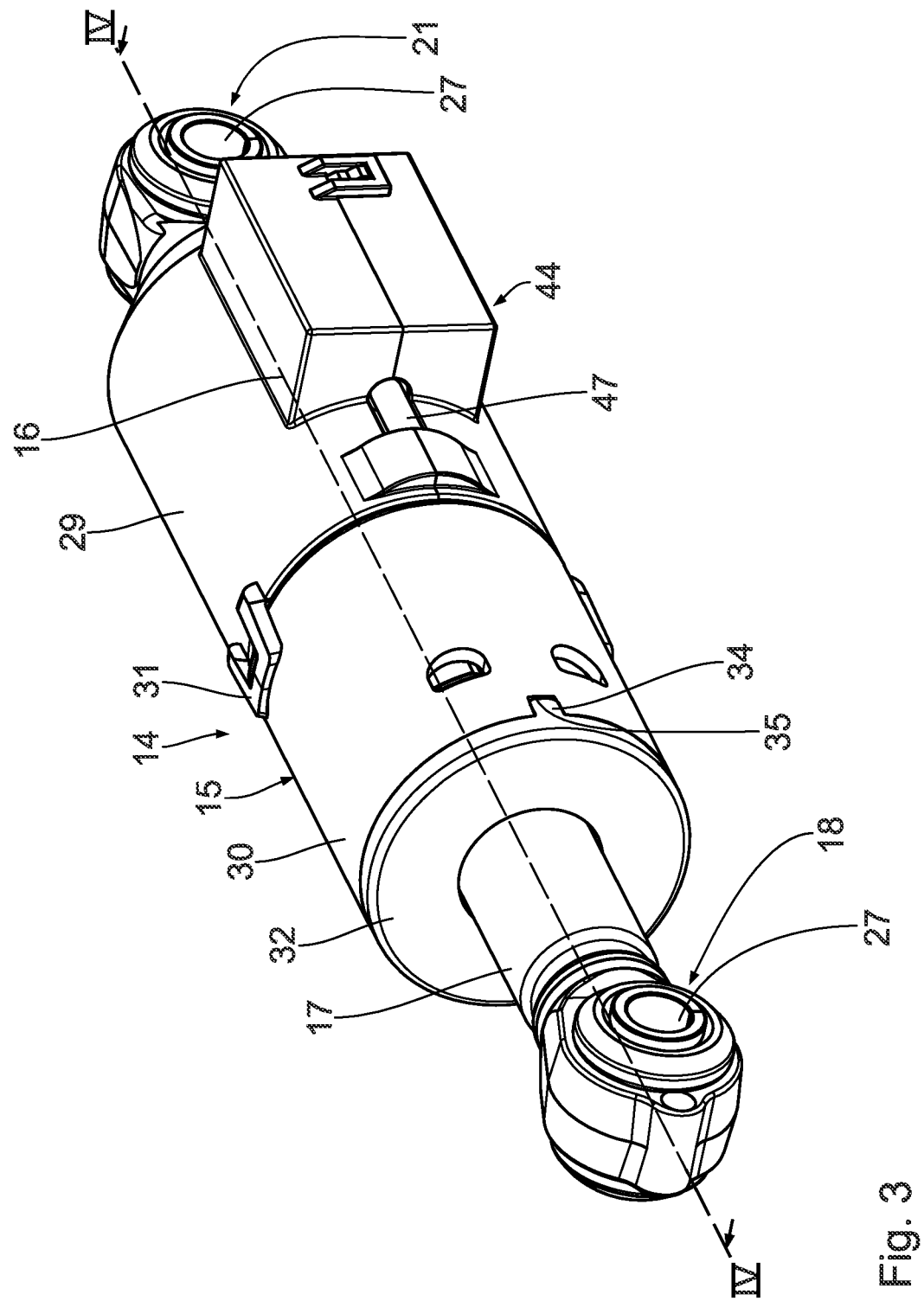
FIG. 3 shows a perspective illustration of a switchable damper according to a first embodiment.

A drum washing machine 1 illustrated in FIGS. 1 and 2 has an oscillatory washing unit 2 having a drive motor 3 which drives a laundry drum 4 about an axis of rotation 6 via a belt drive 5. The laundry drum 4 is arranged in the washing tub 7 and can be driven in rotation about the axis of rotation 6. Other components connected to the washing unit 2, for example a gearing mechanism, are not illustrated for the sake of simplicity. The oscillatory washing unit 2 is suspended by means of two suspension members 8 designed as helical tension springs from a washing machine housing 9, which is supported with respect to and connected to a washing machine frame 10 standing on the floor. On the one hand, the suspension members 8 are attached to first suspension loops 11 arranged in the upper region of the washing unit 2. On the other hand, they are suspended from second suspension eyes 12 formed on the washing machine housing 9. The washing machine housing 9 is covered with a cover plate 13.

On the underside of the washing unit 2, two dampers 14 are mounted centrally in the washing machine housing 9 along the axis of rotation 6 and are connected to the washing machine frame 10. The central longitudinal axes 16 of the dampers 14 are arranged in a common plane, which is oriented perpendicularly to the axis of rotation 6, for example. The dampers 14 may also be arranged in different planes. In particular, the different damper planes are oriented parallel to each other. The planes can also be oriented in an inclined manner to each other. In particular, the planes are arranged at a distance from one another along the axis of rotation 6.

It is also conceivable in principle, in addition or as an alternative to the dampers 14, to arrange dampers on the front end face facing the flap 24 and/or the rear end face of the washing tub 7 facing away from the flap 24. Dampers arranged on the end face of the washing tub 7 can be fastened to the washing machine frame 10 and/or to the washing machine housing 9, in particular to side walls 200 of the washing machine housing 9.

In particular, more than two dampers 14 can be provided. According to the embodiment example shown, the dampers 14 are of identical design and in particular each have an identical damping effect, i.e. friction force. It is conceivable that the dampers 14 are designed differently, in particular have a different damping effect, i.e. friction force. It is essential that at least one of the dampers 14 is an active damper. The other damper may be a passive damper.

In particular, dampers 14 may be provided on the upper side of the washing tub 7 in addition to or as an alternative to the suspension members 8.

At its free end, the plunger 17 has a first fastening member 18 by means of which the damper 14 is attached to a first bearing 19 on the washing unit 2 in such a way that the damper 14 can be pivoted about a first pivot axis 20 relative to the washing unit 2. A second fastening member 21 is attached to the free end of the housing 15, by means of which fastening member 21 the damper 14 is attached to a second bearing 22 on the washing machine frame 10 in such a way that the damper 14 can be pivoted about a second pivot axis 23 relative to the washing machine frame 10. Laundry is fed in and removed through a flap 24 arranged on the washing unit 2.

The dampers 14 are in signal communication with a regulation unit 25 to regulate a damping effect of the dampers 14.

The signal connection of the damper 14 to the regulation unit 25 can be wired or wireless. For reasons of illustration, the signal connection is not shown in FIG. 1.

Furthermore, a determination unit 26 is provided. The determination unit 26 serves to determine at least one input variable. The determination unit is in signal communication with the regulation unit 25. The signal connection can be wireless or wired and is not shown in FIG. 1. The determination unit 26 may have one or more sensors, not shown, and/or be in signal communication therewith, in order to determine the vibration behavior of the components that are movable relative to one another, i.e. of the washing unit 2 relative to the machine frame 10.

In particular, at least one damper-external sensor is provided, which is designed in particular as an acceleration sensor, light barrier, force sensor, frequency sensor and/or as a displacement sensor. Additionally or alternatively, a sensor integrated in the damper 14 can be provided, which can be designed as a magnetic displacement sensor, as an optical sensor, as a force sensor, as a frequency sensor and/or as a flow rate sensor in a hydraulic damper.

In addition or alternatively, the determination unit 26 can be in signal communication with the drive motor 3 in order to determine a current characteristic variable of the drive motor 3, in particular its performance, in particular the motor current and/or the rotational speed.

The regulation unit 25 is designed to generate a regulation signal in dependence on the at least one input variable and to transmit it to at least one of the dampers 14. The regulation unit 25 is in particular designed to be independent, i.e. autonomous, of the appliance control system of the drum washing machine 1. Alternatively, the regulation unit 25 and/or the determination unit 26 may be integrated in the washing appliance control system. The dampers 14 are designed to actively variably define the damping effect in dependence on the received regulation signal in such a way that the vibration behavior of the drum washing machine 1 is improved.

The dampers 14, the regulation unit 25, and the determination unit 26 form a damper assembly that enables improved vibration behavior of the washing unit 2 in the drum washing machine 1. The damper assembly can also be used in other machines. In particular, the damper assembly is applicable independently of the drum washing machine 1.

The function of the damper assembly in the drum washing machine 1 is explained in more detail below. During operation of the drum washing machine 1, the washing unit 2 is set into vibration. The vibrations of the washing unit 2 relative to the washing machine frame 10 are dampened by means of the dampers 14.

During the operation of the drum washing machine, input variables are determined, in particular continuously, with the determination unit 26 and transmitted to the regulation unit 25. The regulation unit 25 generates regulation signals from the input variables, which regulation signals are transmitted to at least one of the dampers 14. In the case of the damper 14 or the dampers 14 receiving the regulation signals, the damping effect is actively, variably determined in order to ensure an improved damping effect.

In the following, a first embodiment of the damper 14 is explained in more detail with reference to FIGS. 3 to 10. The damper 14 is a switchable damper which is used in the drum washing machine 1 to dampen the imbalance of the laundry drum 4.

The dampers 14 are designed as friction dampers. Each friction damper has a tubular housing 15 with a central longitudinal axis 16, in which a plunger 17 is guided for coaxial shifting.

With regard to the design and function of damper 14, which is explained in more detail below, express reference is made to DE 10 2016 207 809 A1.

The damper 14 comprises a substantially cylindrical housing 15 having a central longitudinal axis 16. Concentrically with respect to the central longitudinal axis 16, a substantially tubular plunger 17 is arranged that is displaceable along the central longitudinal axis 16 relative to the housing 15. The plunger 17 may also have a solid cross-section. The plunger 17 has a first end disposed within the housing 15 and a second end extending out of the housing 15. At the second end facing away from the housing 15, the plunger 17 has a first fastening member 18. The first fastening member 18 has a through sleeve 27, the sleeve axis of which is oriented perpendicularly to the central longitudinal axis 16.

At an end of the damper 14 opposite the first fastening member 18, the housing includes a second fastening member 21 that is substantially identical in design to the first fastening member 18 and includes a through sleeve 27. The first fastening member 18 is fixedly connected to the plunger 17. The second fastening member 21 is fixedly connected to the housing 15. In particular, the second fastening member 21 is attached to an end face of a guiding portion 28 of the housing 15.

With the fastening members 18, 21, the damper 14 is arranged in the washing machine, in particular between its frame and the washing drum, in order to dampen a movement of the washing drum, in particular as a result of an imbalance during rotation, with respect to the frame.

Figure 4:
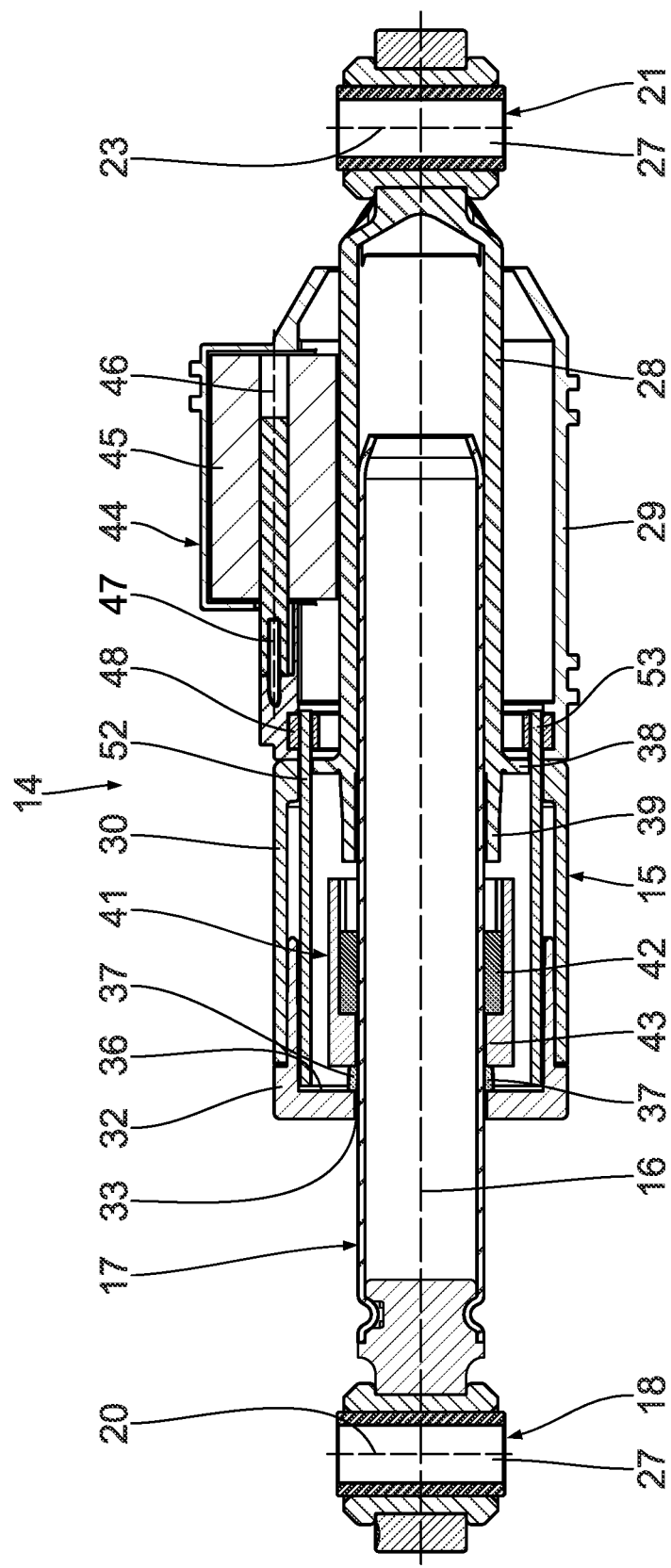
FIG. 4 shows a longitudinal section according to section line IV-IV in FIG. 3.
Figure 6:
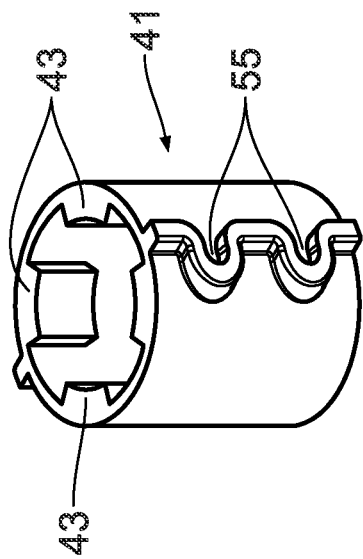
FIG. 6 shows a perspective illustration of a piston of the damper according to FIG. 3.
Figure 5:
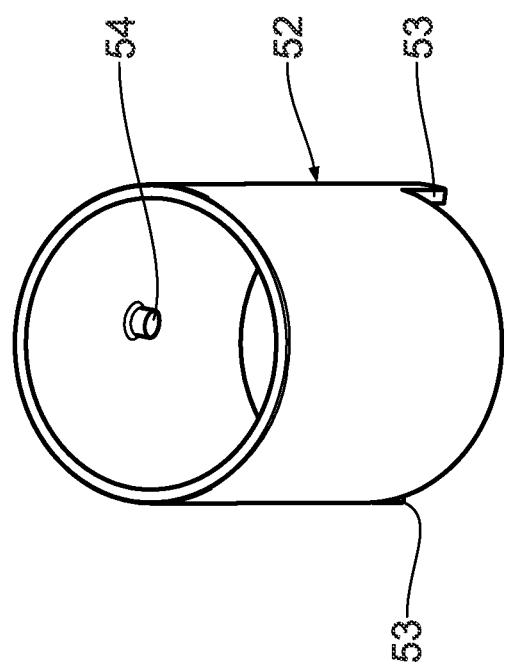
FIG. 5 shows a perspective illustration of a setting member of the damper in FIG. 3.

The housing 15 is made of several parts and comprises a switching housing part 29 shown on the right in FIG. 4 and a friction damping housing part 30 detachably connected thereto. The switching housing part 29 and the friction damping housing part 30 are arranged one behind the other along the central longitudinal axis 16. At the end face opposite the second fastening member 21, the switching housing part 29 is connected to the friction damping housing part 30. The connection can be made by mutually corresponding latching members 31.

At the end of the housing 15 facing the first fastening member 18, the friction damping housing part 30 is closed by means of a guiding cap 32. The guiding cap 32 has a central guiding opening 33 through which the plunger 17 is guided into an interior space of the housing 4. The guiding cap 32 has at least one positioning web 34 extending along the central longitudinal axis 16, which positioning web 34 engages in a recess 35 provided for this purpose on the housing 15, in particular of the friction damping housing part 30. The positioning web 34 unambiguously fixes the rotational position of the guiding cap 32 relative to the housing 15. The positioning web 34 also serves as protection against rotation of the guiding cap 32 relative to the housing 15 about the central longitudinal axis 16.

Four cap freewheel stops 37 are integrally formed on the guiding cap 32 on an inner side of the end face 36. The cap freewheel stops 37 are oriented parallel to the central longitudinal axis 16 and are arranged in a circular segment around the plunger 17 in a plane perpendicular to the central longitudinal axis 16. In particular, the guiding cap 32 is made of an elastic material, in particular plastic. More or fewer than four cap freewheel stops 37 may also be provided. The cap freewheel stops 37 are spaced apart from one another in a tangential direction with respect to the central longitudinal axis 16, in particular equally spaced apart. A spacing is provided between two adjacent cap freewheel stops 37.

A housing bottom 38 is integrally formed on the end face of the friction damping housing part 30 opposite the guiding cap 32. The housing bottom 38 is oriented perpendicularly to the central longitudinal axis 16. Starting from the housing bottom 38, for example, four bottom freewheel stops 39 extend in the direction of the guiding cap 32. The bottom freewheel stops 39 are each oriented parallel to the central longitudinal axis 16 and are designed to correspond to the cap freewheel stops 37. The guiding portion 28 is integrally formed on the housing bottom 38 facing away from the bottom freewheel stops 39. The guiding portion 28 serves to guide the plunger 17 during an axial displacement within the housing 15. The inner diameter of the guiding portion 28 corresponds substantially to the outer geometry of the plunger 17. At the end opposite the plunger 17, the second fastening member 21 is arranged at the guiding portion 28. The guiding portion 28 is passed through the switching housing part 29 and the second fastening member 21 protrudes at the rear end of the housing 15 illustrated on the right in FIGS. 3 and 4.

A friction unit comprising a piston 41 is arranged in the housing 15, in particular in the friction damping housing part 30. The piston 41 is substantially hollow cylindrical in shape. The piston 41 is displaceable along the central longitudinal axis 16 in the housing 15 and relative to the plunger 17. The piston 41 is arranged in the radial direction of the central longitudinal axis 16 between the plunger 17 and the housing 15.

The piston 41 has an inner annular groove in which a friction lining 42 is arranged. The friction lining 42 is part of the friction unit. The friction lining 42 is accommodated guided through the piston 41. A movement of the piston 41 along the central longitudinal axis 16 causes a displacement of the friction lining 42. The friction lining 42 is designed in particular as a friction strip, the end faces of which can be even or uneven, for example serrated or corrugated or in another profiling. The annular friction lining 42 rests with an inner cylindrical friction surface against an outer side of the plunger 17. A relative movement between the plunger 17 and the friction lining 42 causes a friction force to counteract the movement, i.e., a friction damping.

The inner groove of the piston 41 is bounded on both sides in the axial direction by guiding webs 43. The guiding webs 43 are made in one piece with the piston 41. The guiding webs 43 project radially inwards with respect to the central longitudinal axis 16 opposite the inner groove. The guiding webs 43 are each designed in the form of ring segments in a plane perpendicular to the central longitudinal axis 16. The inner contour defined by the guiding webs 43 corresponds essentially to the outer contour of the plunger 17, wherein the inner contour in the region of the guiding webs 43 is larger than the outer contour of the plunger 17 in such a way that a direct contact of the plunger 17 by the piston 41 is excluded.

Four guiding webs 43 are provided at each end face of the piston 41. The guiding webs 43 are designed with respect to their tangential extension about the central longitudinal axis 16 in such a way that they can engage in the spaces between the cap freewheel stops 37 and in the spaces between the bottom freewheel stops 39, respectively. According to the illustration of the damper in FIG. 2, the piston 41 is arranged adjacent to the guiding cap 32. The guiding webs 43, which face the guiding cap 32, engage in the gaps between adjacent cap freewheel stops 37. This prevents unintentional rotation of the piston 41 relative to the housing 15. With respect to their tangential position, the four cap freewheel stops 37 are arranged rotated by 45° with respect to the bottom freewheel stops 39. Due to the spaces between two guiding webs 43, the friction lining 42 is exposed in the piston 41 in the axial direction of the central longitudinal axis 16, at least in some regions. This exposed region of the friction lining 42 can abut against the cap freewheel stops 47 or bottom freewheel stops 39 on the end face. The friction lining 42 serves as a stop buffer.

The damper 14 further has a switching unit 44 that enables switching between a locking arrangement and a freewheel arrangement of the piston 41. The switching unit 44 comprises a switching actuator 49 having a switching drive 45. According to the shown embodiment, the switching drive 45 is designed as a lifting solenoid, which causes a linear lifting movement, triggered by electrical switching.

Figure 8:
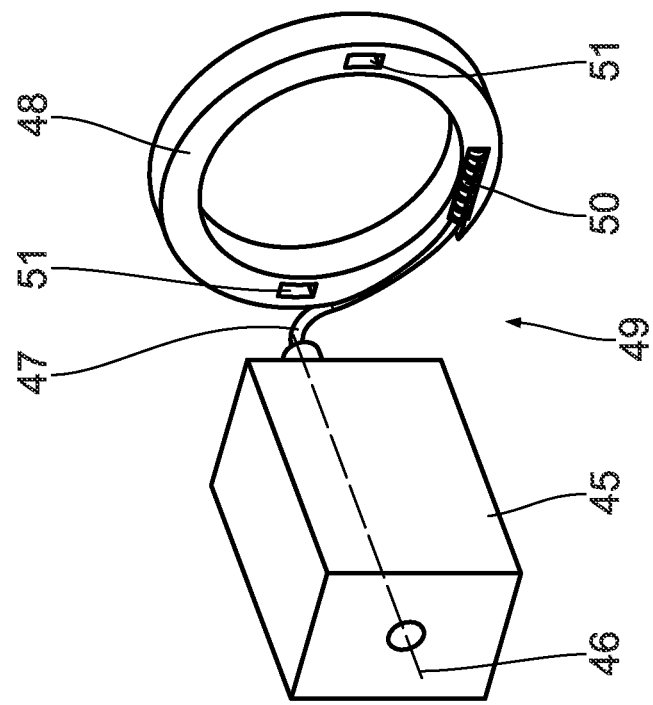
FIG. 8 shows a perspective illustration of a switching actuator of the damper according to FIG. 3.
Figure 7:
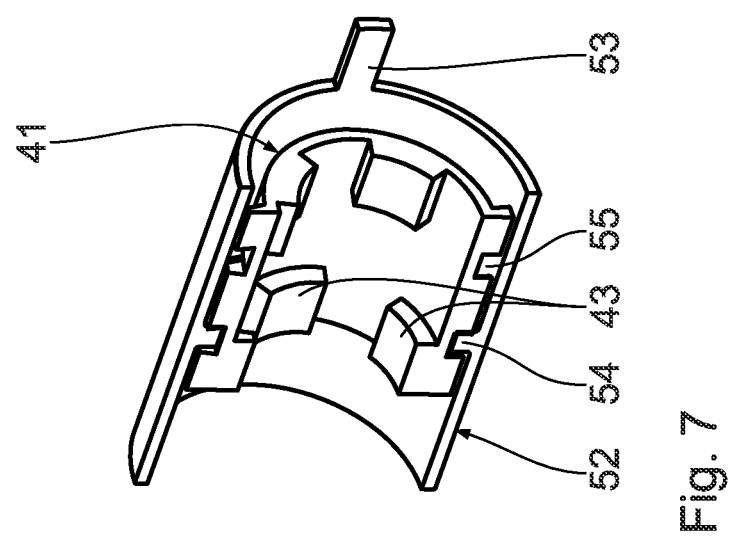
FIG. 7 shows a partially cut-clear perspective illustration of the piston and the setting member in a locking arrangement.

The lifting solenoid is attached to the housing 15 of the damper 14 in such a way that the linear lifting axis 46 is oriented parallel to the central longitudinal axis 16 of the damper. In the region of the switching housing part 29 in which the lifting solenoid is arranged, the housing 15 is noncircular, i.e. deviates from a cylindrical shape. The lifting solenoid is connected to a setting ring 48 via a force transmission member 47. The switching drive 45 as a switchable lifting solenoid, the force transmission member 47 and the setting ring 48 form the switching actuator 49, which is shown in FIG. 8. The force transmission member 47 is designed as a flexible wire, which is guided in particular along a rigid guiding channel. The force transmission member engages in particular essentially radially on the setting ring 48 and can be displaced there against a spring force by means of an energy storage member in the form of a spring member 50. The setting ring 48 has two openings 51 arranged eccentrically to the central longitudinal axis 16, in which a sleeve-shaped setting member 52 having end-face engaging webs 53 engages. The setting member 52 is a component of the switching unit 44. The switching unit 44, in particular in the form of the setting member 52, enables a form-fit connection to the piston 41 in the locking arrangement and a release of the piston 41 in the freewheel arrangement. For this purpose, the setting member 52 has a radial pin as a profile member 54 on an inner side of the inner cylinder jacket surface, which radial pin can engage in a mating profile member 55 on a profile link. The mating profile members 55 are integrally formed on an outer surface of the substantially cylindrical piston 41. According to the embodiment example shown, two profile links are provided on the piston 41, wherein each profile link has two mating profile members 55. The mating profile members 55 are each substantially U-shaped, wherein the parallel legs of the U extend circumferentially about the central longitudinal axis 16 in the installed state of the piston 41. The profile links are arranged diametrically opposite one another with respect to the central longitudinal axis 16 on the outside of the piston 41. The respective opening of the U is oriented in the circumferential direction about the central longitudinal axis 16.

Figure 9:
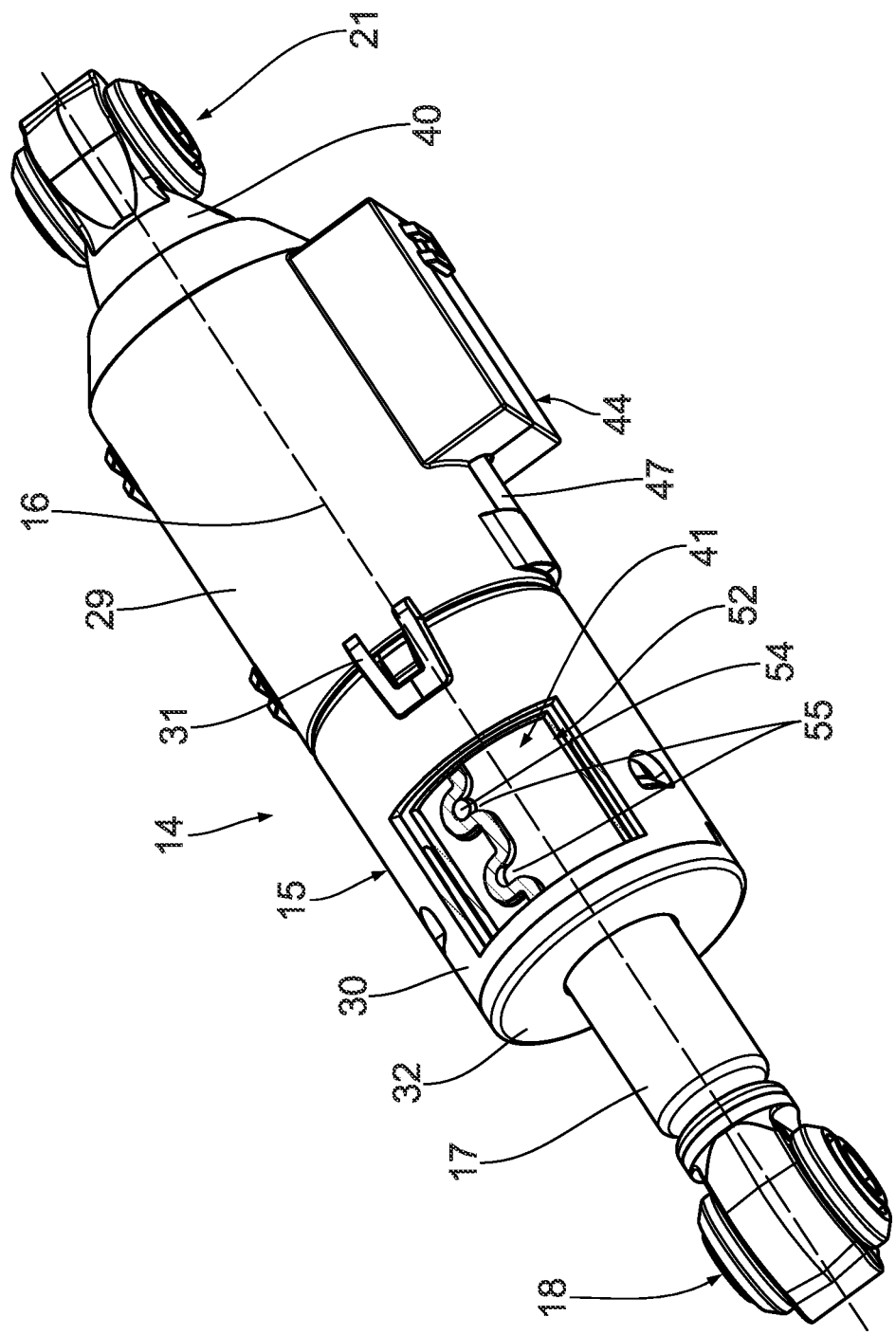
FIG. 9 shows a partially cut-clear perspective illustration of the damper according to FIG. 3 in the locking arrangement.

The function of the friction damper 14 is explained in more detail below. According to the arrangement of the setting member 52 as shown in FIG. 9, the damper 14 is located in the locking arrangement. In the locking arrangement, the profile member 54 is located in one of the mating profile members 55. The parallel legs of the U of the mating profile members 55 form an undercut in a direction parallel to the central longitudinal axis 16. A displacement of the piston 41 relative to the housing 15 and/or the plunger 17 is blocked. A relative displacement of the plunger 17 with respect to the housing 15 causes a friction force due to the friction lining 42 which is radially resting against the plunger 17 and axially blocked. In this arrangement, the friction damping function of the damper 14 is switched on, i.e. activated.

Figure 10:
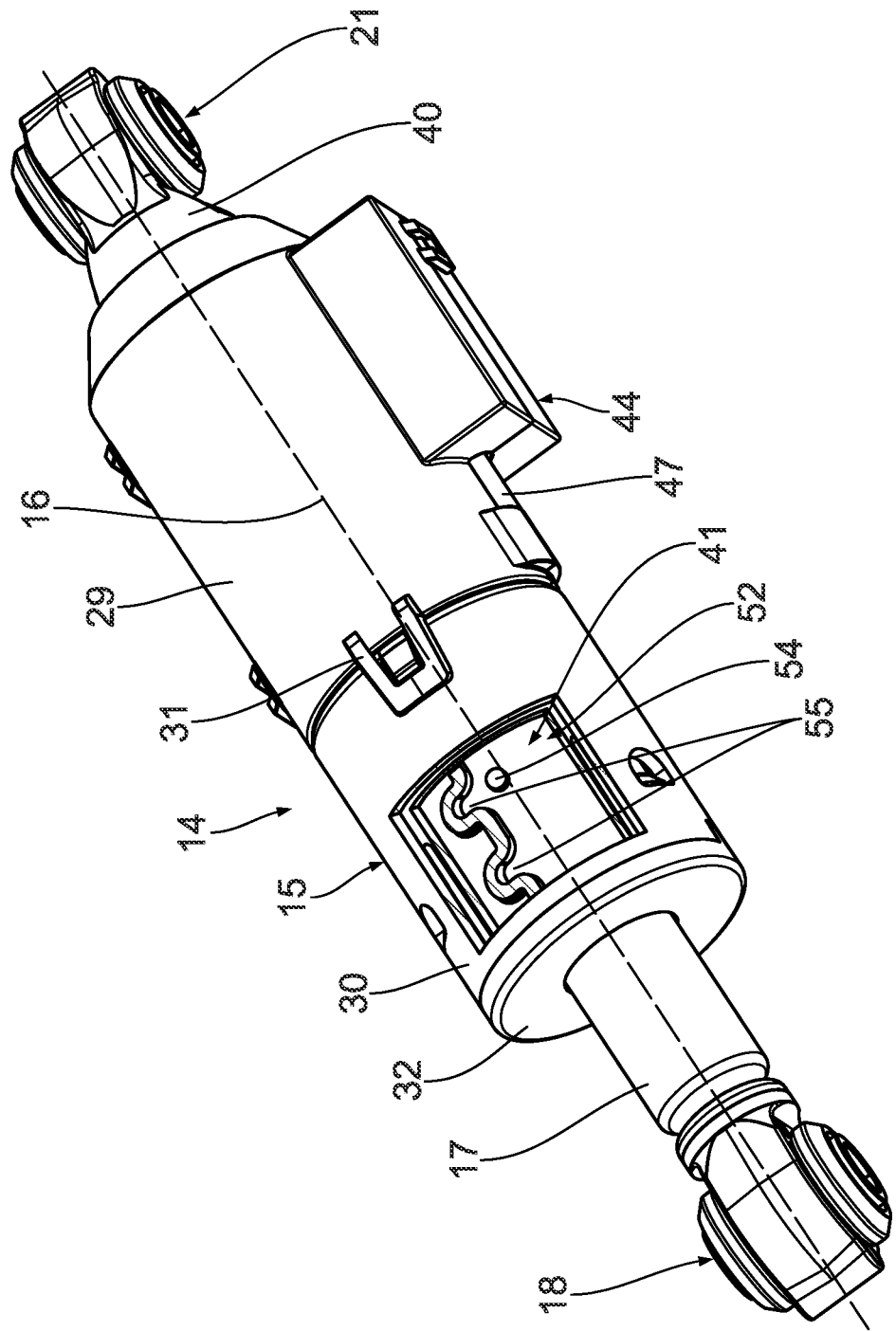
FIG. 10 shows an illustration corresponding to FIG. 9 of the damper in the freewheel arrangement.
Figure 11:
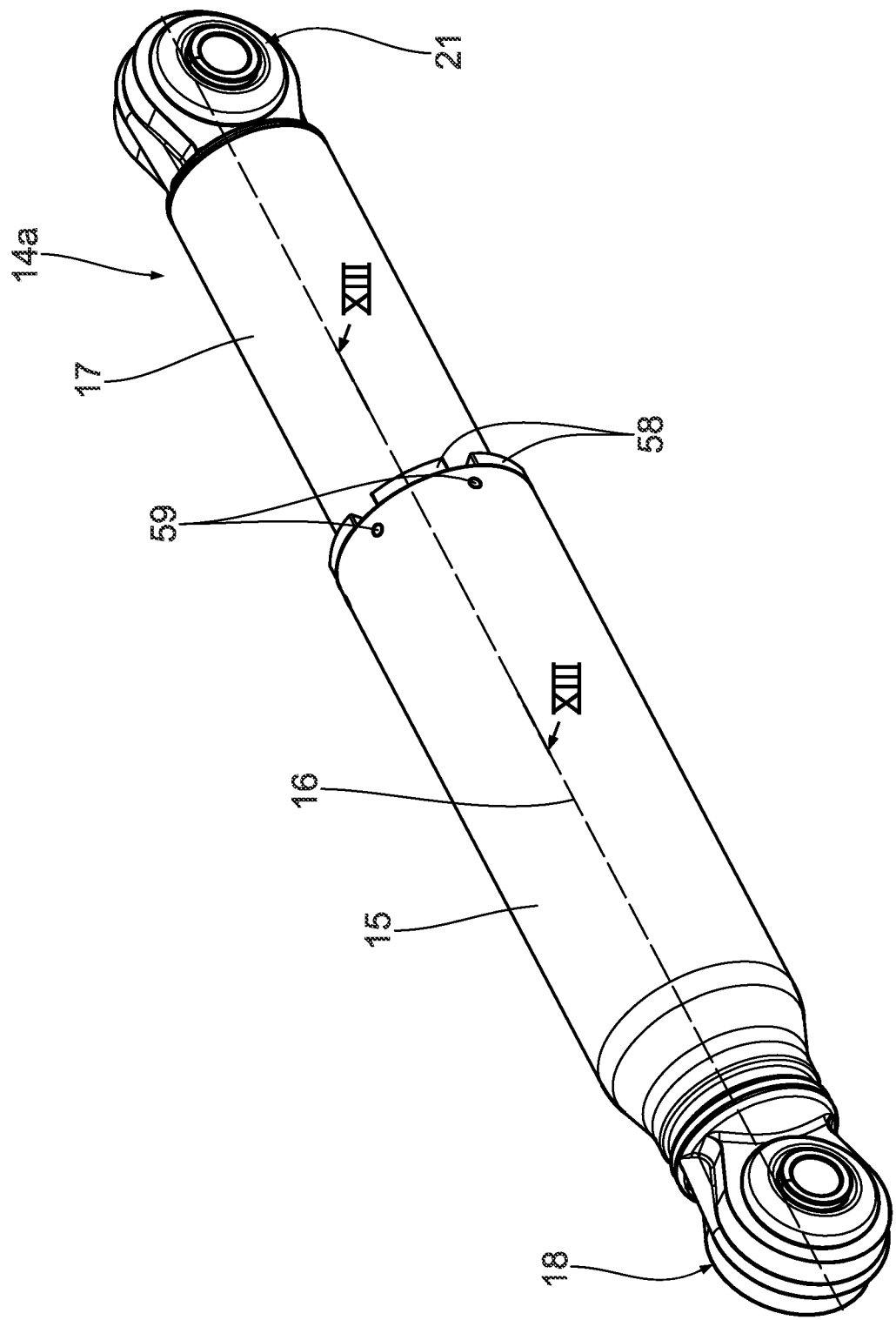
FIG. 11 shows a perspective view of a friction damper according to a further embodiment including a friction device.
Figure 12:
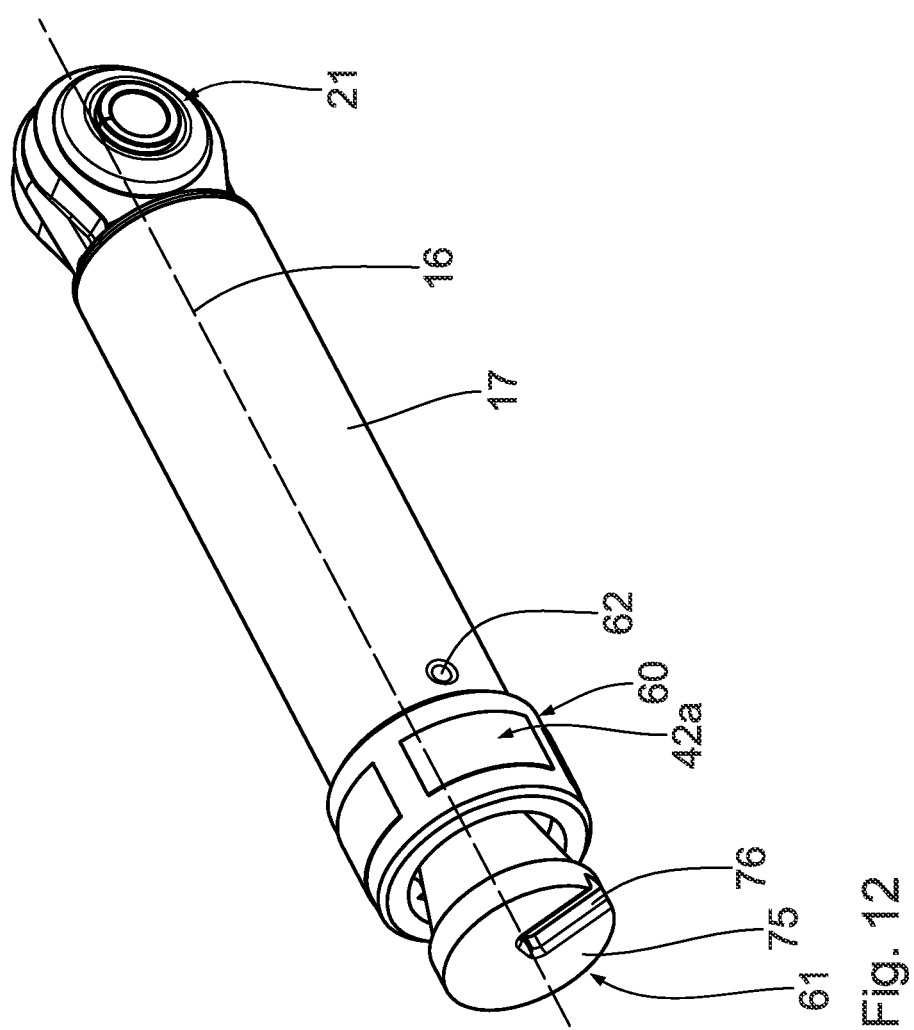
FIG. 12 shows a partial illustration of the friction damper corresponding to FIG. 11 with the friction device exposed.

In order to switch the damper 14 into the freewheel arrangement, the switching unit 44 is activated by actuating the switching actuator 49. By switching the lifting solenoid 45, the force transmission member 47, which engages the lifting solenoid 45, is displaced along the lifting axis 46. The force transmission member 47 is fed radially to the setting ring 48 along the curved guiding channel. The force transmission member 47 exerts a torque on the setting ring 48 about the central longitudinal axis 16 and causes the setting ring 48 to rotate about the central longitudinal axis 16. Together with the setting ring 48, the setting member 52 is rotated, which setting member 52 is held in the openings 51 of the setting ring 48 by the engagement webs 53. As a result of the rotation of the setting member 52, the profile member 54 is rotated about the central longitudinal axis 16 relative to the piston 41, the plunger 17 and the housing 15. The profile member 54 is displaced out of the mating profile member 55. The freewheel arrangement of the damper is shown in FIG. 10. In the freewheel arrangement, the profile member 54 is arranged at a distance from the mating profile member 55 in the circumferential direction, i.e. in the tangential direction, with respect to the central longitudinal axis 16. The piston 41 is released by the setting member 52. In the freewheel arrangement, the piston 41 can be displaced along the central longitudinal axis 16 relative to the housing 15 and relative to the plunger 17.

To transfer the damper 14 back to the locking arrangement, the lifting solenoid 45 is switched in the corresponding opposite direction and thus the setting member 52 is rotated in the opposite direction about the central longitudinal axis 16.

The spring member 50 is part of a safety device which enables the switching unit 54 to be switched again in the event of a power failure. For this purpose, a capacitor not shown is provided which can store electrical energy that is sufficient to switch the lifting solenoid 45 in the event of an interruption in a power supply. The movement of the lifting solenoid 45 is mechanically stored in the spring member 50.

The two mating profile members 55 of a profile link are spaced apart from one another along the central longitudinal axis 16. This makes it possible for the piston 41 to be locked in various positions along the central longitudinal axis 16 by means of setting member 52 and its profile member 54. In particular, insertion chamfers can be provided on the mating profile member 55 along the direction of rotation of the setting member 52 to facilitate insertion of the profile member 54 into the mating profile member 55 in the event of imprecise arrangement, i.e. if the profile member 54 is not exactly aligned with respect to the mating profile member 55.

Other embodiments for the profile member 54 and the mating profile member 55 are also conceivable. According to an embodiment not shown, the profile member 54 can, for example, be wedge-shaped, which can engage in a locking manner with a wedge tip in one of a plurality of serrated recesses, in particular a plurality of serrated recesses corresponding to the wedge tip, on a profile link. In particular, at least five, in particular at least 10, and in particular at least 20 corresponding recesses into which the wedge tip can engage can be provided at the profile link. This makes it possible for the profile member to engage in one of the mating profile members essentially independently of the axial positioning of the piston 41.

The friction lining 42 can also be arranged on an outer side of the piston 41. In this case, the mating profile member 55 is implemented on an inner side of the piston 41. The profile member 54 would then be arranged between the plunger 17 and the piston 41.

Other designs of the damper 14 are also possible, wherein in particular other designs of the switching actuator 49 are conceivable. The switching actuator 49 can have a switchable rotary solenoid as the switching drive, which is also known as a plunger coil or voice coil. The rotary solenoid enables rotary movement of an active component relative to a static, passive component. A damper of this type has a particularly compact design.

In the following, a further embodiment of the invention is described with reference to FIGS. 11 to 21. Constructively identical parts are given the same reference numerals as in the first embodiment, the description of which is hereby referred to. Constructively different but functionally similar parts are given the same reference numerals with a trailing letter a.

A damper 14a shown in FIGS. 11 to 14 has a housing 15 having a central longitudinal axis 16. With regard to the structure and function of the damper 14a, reference is made to DE 10 2016 225 036 A1.

The housing 15 is formed by a first housing part, which is designed as an outer tube and to which a first fastening member 18 is attached. The first fastening member 18 can be used to fasten the damper 14a to a component. At the end facing the first fastening member 18, the first housing part is closed. At the end opposite to the first fastening member 18, the first housing part is open. Through this opening, a second housing part in the form of an inner tube is inserted into the first housing part. The second housing part forms the plunger 17.

At the end opposite the first housing part, the second housing part is closed. A second fastening member 21 is provided at the closed end of the second housing part, with which second fastening member 21 the damper 14a can be fastened to a further component. The fastening members 18, 21 are each designed, for example, as fastening eyes with inserted sleeves that are oriented transversely to the central longitudinal axis 16. The housing parts are displaceable relative to each other along the central longitudinal axis 16. A guiding member 58 is provided at the open end of the first housing part for guided displacement of the second housing part.

According to the embodiment example shown, the housing parts are each designed as cylindrical tubes. In principle, it is also conceivable that the housing parts have a non-round contour in a plane perpendicular to the central longitudinal axis 16. For example, the housing parts can be designed as square tubes, rectangular tubes or oval tubes. In such a design, a rotation of the housing parts with respect to the central longitudinal axis 16 is prevented by form fit.

The damper 14a further comprises a pull-out protection which prevents the second housing part 6 from being unintentionally pulled far out of the first housing part. According to the embodiment example shown, the pull-out protection is ensured by the fact that radially inwardly projecting profile members 59 are provided on the first housing part and are arranged along a circular line around the central longitudinal axis 16. The profile members 59 engage behind the guiding member 58 inside the first housing part. The guiding member 58 is axially and radially fixed to the first housing part with respect to the central longitudinal axis 16. The guiding member 58 projects inwardly in a radial direction with respect to the central longitudinal axis 16 on the first housing part.

According to the shown embodiment example, a friction unit is attached to the second housing part, i.e., to the inner tube. The friction unit comprises a friction lining carrier 60, an adjustable friction lining 42a arranged on the friction lining carrier 60, and an adjustment member 61 for adjustably arranging the friction lining 42a on the friction lining carrier 60. The friction unit is fixed to the second housing part along the axial direction of the central longitudinal axis 16 and with respect to a rotation about the central longitudinal axis 16. According to the embodiment example shown, the attachment of the friction unit to the second housing part is carried out by means of an indentation 62 on the inner tube for clamping the friction lining carrier 60.

The friction unit protrudes in a radial direction with respect to the central longitudinal axis 16 on the second housing part. The guiding member 58 forms an extraction stop for the second housing part in that the friction unit, in particular the friction carrier 60, is prevented from axial displacement by the guiding member 58 by a radially projecting annular shoulder 65.

Figure 15:
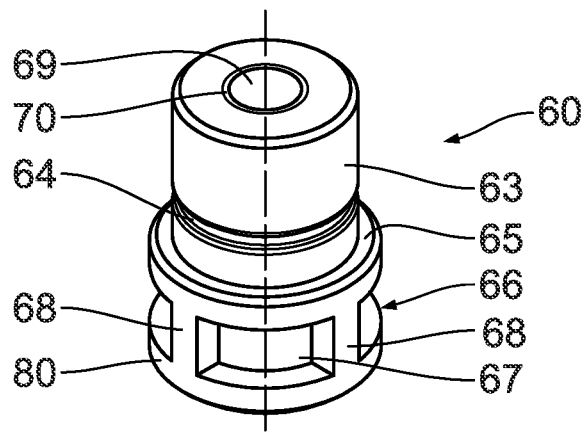
FIG. 15 shows an enlarged perspective illustration of a friction lining carrier of the friction device in FIG. 12.
Figure 16:
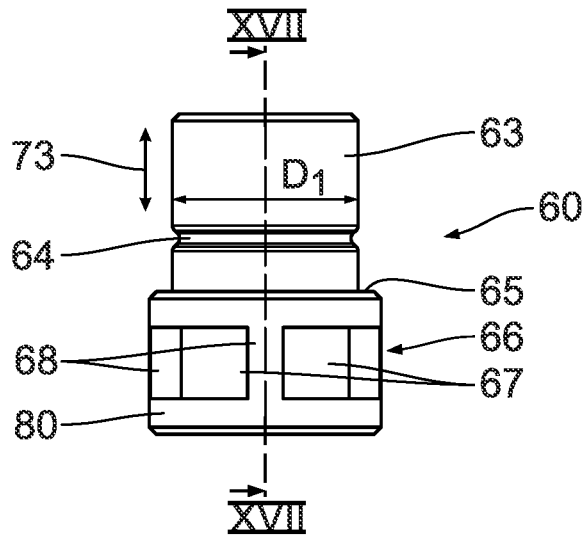
FIG. 16 shows a side view of the adjustment member according to FIG. 15.
Figure 17:
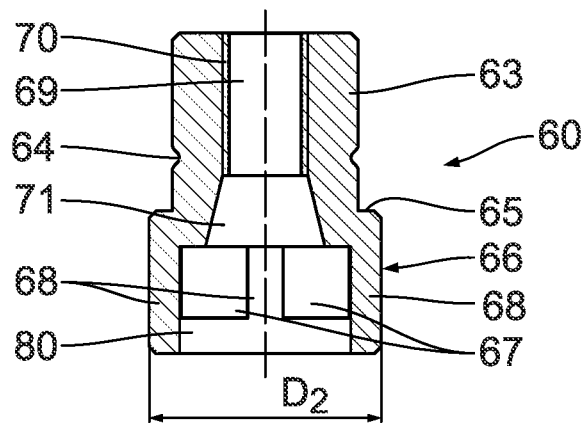
FIG. 17 shows a longitudinal section according to section line XVII-XVII in FIG. 16.

The structure of the friction lining carrier 60 is explained in more detail below with reference to FIGS. 15 to 17. The friction lining carrier 60 is made in one piece, for example of plastic. The friction lining carrier 60 is of essentially hollow cylindrical design with a pin-like anchoring portion 63, with which the friction lining carrier 60 is inserted into the inner tube of the second housing part at the end face. The anchoring portion 63 has a circumferential inner groove 64 in which the indentation 62 engages in order to hold the friction lining carrier 60 on the second housing part. In the region of the anchoring portion 63, the friction lining carrier 60 has a first outer diameter $D_1$ which corresponds substantially to the inner diameter of the inner tube of the second housing part.

The friction lining carrier 60 has the radially projecting annular shoulder 65 adjoining the anchoring portion 63, with which annular shoulder 65 the friction lining carrier 60 rests against an annular end face of the second housing part. The friction lining carrier 60 is axially supported by the annular shoulder 65 against the inner tube of the second housing part.

A carrier portion 66 adjoins the annular shoulder 65 along an axial direction. The carrier portion 66 has a second outer diameter $D_2$, which is larger than the first outer diameter $D_1$. The second outer diameter $D_2$ corresponds essentially to the inner diameter of the outer tube of the first housing part. The carrier portion 66 has a plurality of, in particular at least one and, according to the embodiment example shown, exactly four window-like radial recesses 67 along the outer circumference. Two adjacent radial recesses 67 are separated from each other in each case by an axial web 68. On the end face, the friction lining carrier 60 has an annular web 80 in the region of the carrier portion 66.

The friction lining carrier 60 has a through bore 69 along an axial direction. In the region of the anchoring portion 63, the through bore 69 is designed with an adjustment slot 70 as a movement thread. In the region of the transition from the anchoring portion 63 to the carrier portion 66, the through bore 69 is designed as a frustoconical supporting portion 71.

Figure 18:
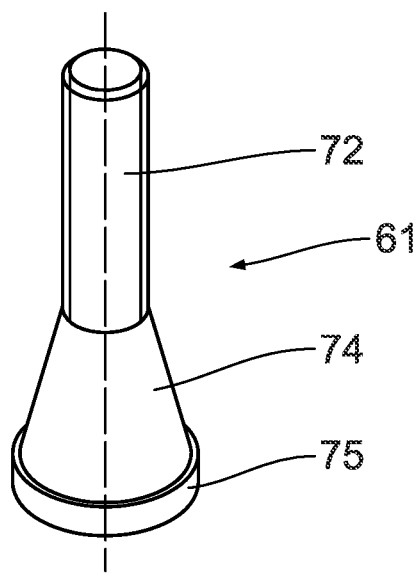
FIG. 18 shows an enlarged perspective illustration of an adjustment member of the friction device according to FIG. 12.
Figure 19:
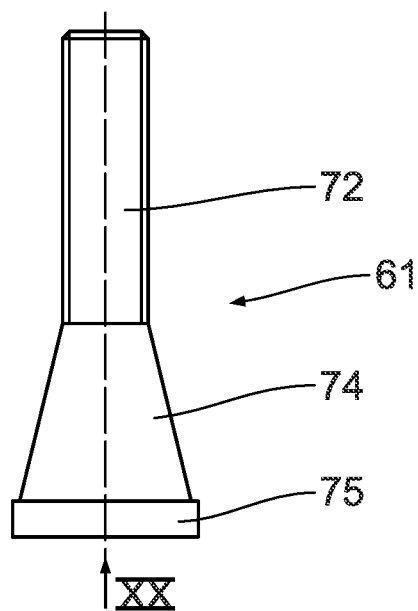
FIG. 19 shows a side view of the adjustment member according to FIG. 18.
Figure 20:
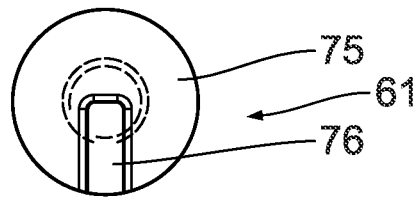
FIG. 20 shows a view according to arrow XX in FIG. 19.

The adjustment member 61 is explained in more detail below with reference to FIGS. 18 to 20. The adjustment member 61 has an adjustment pin 72. The adjusting pin 72 has an external thread that corresponds to the internal thread of the adjustment slot 70. The adjustment member 61 can be arranged with the adjustment pin 72 on the adjustment slot 70 of the friction lining carrier 60 so as to be adjustable along an adjustment direction 73. The adjustment direction 73 corresponds to an axial direction of the friction lining carrier 60.

The friction unit is arranged in the damper 14a in such a way that the adjustment direction 73 is oriented to the central longitudinal axis 16.

Adjacent to the adjustment pin 72, a pressing portion 74 is provided which, starting from the adjustment pin 72, has a conically widening contour. At an outer end, the adjustment member 61 has a contact member 75 with which the adjustment member 61 can rest at the end against the friction lining carrier 60 to limit the adjustment.

An actuating portion 76 is provided on the end face of the contact member 75, which actuating portion 76 is designed as an eccentrically arranged slot-like recess.

Figure 21:
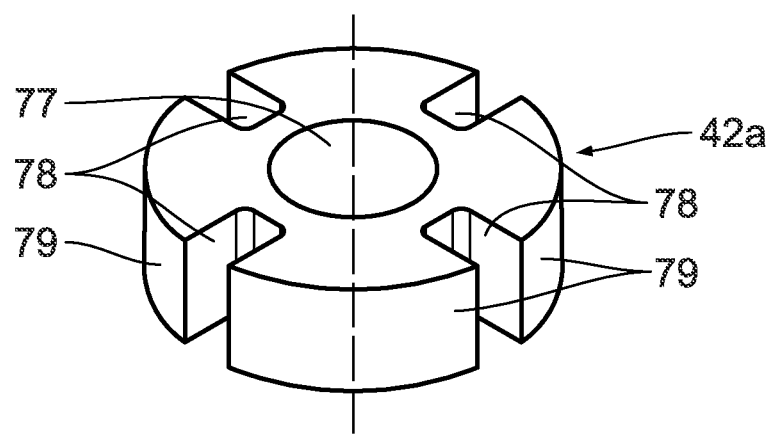
FIG. 21 shows a perspective enlarged detail view of a friction lining of the friction device according to FIG. 12.
Figure 22:
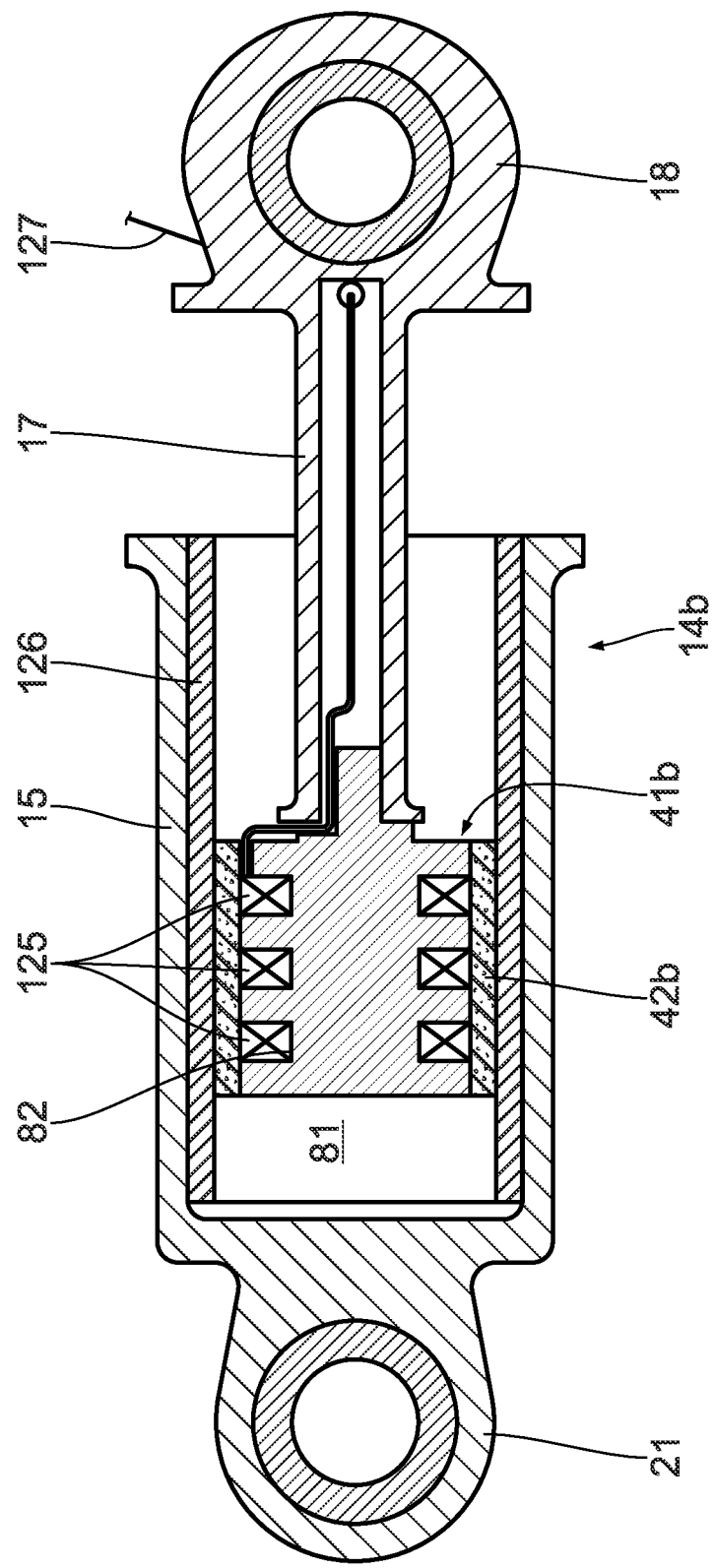
FIG. 22 shows a longitudinal section of a damper with magneto-rheological fluid according to a further embodiment.

The friction lining is explained in more detail below with reference to FIGS. 21 and 22. The friction lining 42a is essentially annular disc-shaped with a central circular opening 77 through which the adjustment member 61 can be guided. Along the outer circumference, a plurality of radially inwardly projecting recesses 78 are provided on the friction lining 42a, with which the friction lining 42a can be fixed to the axial webs 68 of the friction lining carrier 60. This ensures protection against rotation for the friction lining 42a in the friction lining carrier 60. Between each of the recesses 78, the friction lining 42a has radially projecting friction lining portions 79. The geometry of the friction lining portions 79 corresponds essentially to the size of the opening of the radial recesses 67 on the friction lining carrier 60.

The friction lining 42a may also have a plurality of friction lining portions 79 that are separate from one another.

The friction lining 42a can be arranged in the friction lining carrier 60, in particular within the carrier portion 66, in such a way that the friction lining portions 79 project radially outward through the radial recesses 67. Due to the axial webs 68 engaging in the recesses 78, the friction lining 42a is radially fixed in a direction of rotation about the central longitudinal axis 16. The friction lining 42a is fixed to the friction lining carrier 60 along the axial direction by the end face circumferential annular web 80, which is engaged behind by the friction lining portions 79.

Figure 13:
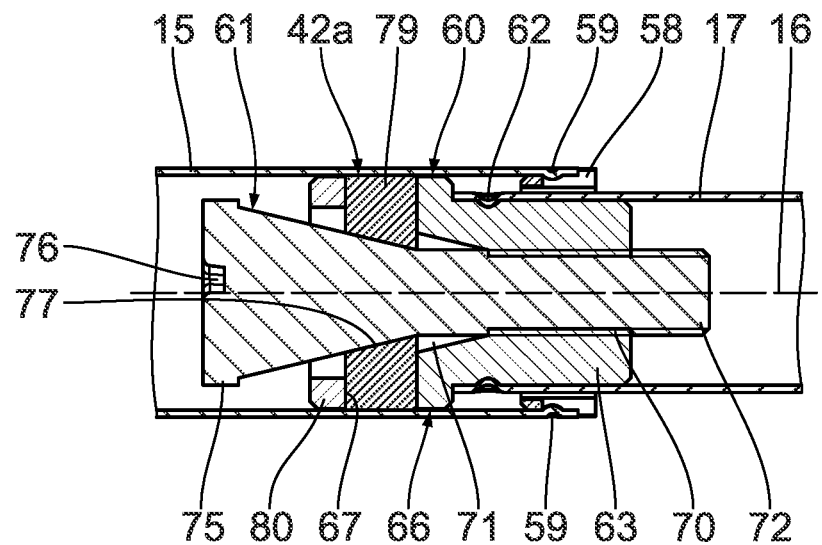
FIG. 13 shows a longitudinal section according to section line XIII-XIII in FIG. 11 to illustrate the friction device in a first adjustment position.

The function of the friction damper is explained in more detail below with reference to FIG. 13. The friction unit is held in the inner tube by the friction lining carrier 60. The friction lining 42a is inserted in the carrier portion 66 of the friction lining carrier 60 so that the friction lining portions 79 are arranged in the radial recesses 67. The adjustment member 61 is passed through the opening 77 of the friction lining 42a with the adjustment pin 72, and is screwed in with the external thread on the adjustment slot 70 of the friction lining carrier 60.

According to the embodiment example shown, the outer diameter of the adjustment pin 72 is smaller than the inner diameter of the opening 77. As long as the adjustment member 61 is screwed into the friction lining carrier 60 to such a small extent that only the adjustment pin 72 is arranged inside the opening 77, radial expansion of the friction lining 42a does not occur.

By actuating the adjustment member 61 by means of the actuating member, with the actuating counter portion resting against the actuating portion 76, a torque can be transmitted from the actuating member to the adjustment member 61. The rotary movement of the adjustment member 61 causes an axial displacement of the adjustment member 61 as a result of the adjustment slot 70. The axial displacement of the adjustment member 61 along the central longitudinal axis 16 causes the conically widening pressing portion 74 to increasingly push into the opening 77 of the friction lining 42a.

As soon as the outer diameter of the pressing portion 74 is larger than the inner diameter of the opening 77 of the friction lining 42a, the friction lining 42a is exposed to a contact force acting radially outward. On the one hand, the contact force causes compression of the material from which the friction lining 42a is made. In addition, the friction lining portions 79 are pressed radially outward through the radial recesses 67 as a result of the contact force. The friction lining 42a is pressed directly against an inner side of the first housing part, that is, of the outer tube. Depending on the pressure force with which the friction lining 42a bears against the inner side of the first housing part, a force results when the housing parts are displaced along the central longitudinal axis 16 relative to one another.

Figure 14:
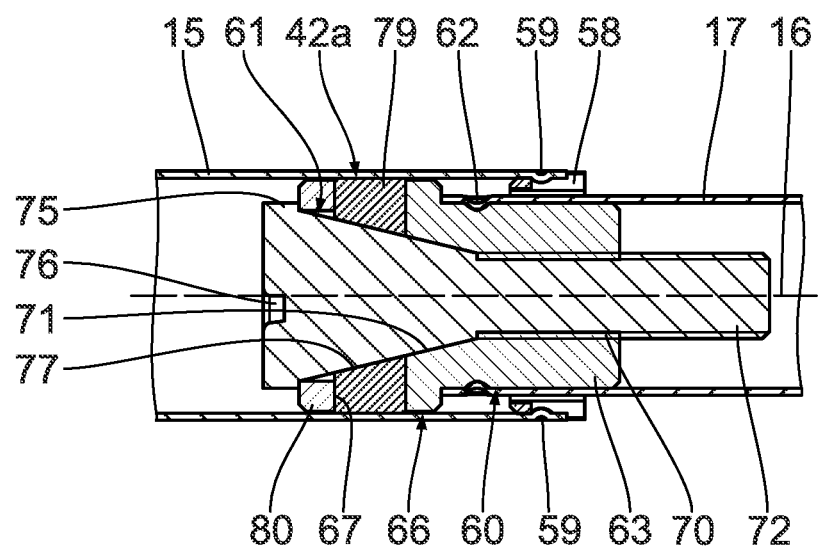
FIG. 14 shows an illustration corresponding to FIG. 13 in a second adjustment position different from the first adjustment position.

Such an arrangement is shown in FIG. 14. The adjustment member 61 is screwed into the friction lining carrier 60 to a maximum depth. The adjustment member 61 rests with the contact member 75 on the end face against the ring web 80 of the friction lining carrier 60. A further axial displacement of the adjustment member 61 along the central longitudinal axis 16 is prevented. In the arrangement, a further axial displacement is also prevented by the adjustment member 61 with the pressing portion 74 resting against the supporting portion 71. The support of the adjustment member 61 on the friction lining carrier 60 is robust. A maximum screw-in depth is robustly set.

In the arrangement shown in FIG. 14, a maximum contact force is delivered from the pressing portion 74 to the friction lining 42a. In this arrangement, the friction effect of the damper 14a is at a maximum.

It is also conceivable to provide in the damper 14a an assembly known as an expanding piston, which comprises the adjustment member 61 by means of which expanding piston the friction lining 42a can be displaced radially with respect to the central longitudinal axis 16.

According to another alternative embodiment example, the assembly may be configured as a longitudinally slotted sleeve with a sleeve body forming the friction lining carrier 60.

It is further conceivable that a drive is provided which drives the adjustment of the adjustment member 61 by motor. The drive is designed in particular in the form of an electric motor and in particular integrated in the second housing part.

In the following, a third embodiment of the invention is described with reference to FIG. 22. Constructively identical parts are given the same reference numerals as in the first two embodiments, to the description of which reference is hereby made. Constructively different but functionally similar parts are given the same reference numerals with a trailing letter b.

At the end of the plunger 17 located in the housing interior space 81 of the housing 15, a piston 41b is provided which is provided with annular recesses 82, in each of which a coil 125 is arranged which is wound around the piston 41b. A sleeve 126 of magnetically permeable material is provided on an inner surface of the housing 15 and serves as a pole shoe. The coils 125 which generate the electromagnetic field are connected to a controller via a connecting line 127.

A friction lining 42b is arranged on an outer side of the piston 41b, which is essentially cylindrical in shape, and is in particular of annular-cylindrical shape.

The friction lining 42b is made of an open-cell foamed plastic material, for example polyurethane or polyamide. The foamed plastic material serves as a retention medium for a magnetorheological fluid, such as those known from U.S. Pat. No. 5,382,373 or 5,578,232. The basic structure of a magneto-rheological friction damping in application to a friction damper is known from WO 99/22 162 A1, the description of which is expressly referred to.

In the following, a fourth embodiment of the invention is described with reference to FIGS. 23 to 26. Constructively identical parts are given the same reference numerals as in the previous embodiments, to the description of which reference is hereby made. Constructively different but functionally similar parts are given the same reference numerals with a trailing letter c.

In the following, with reference to FIGS. 23 to 26, a further embodiment example of the invention is described. With regard to the structure and function of the damper 14c, reference is made to DE 10 2011 080 962 A1. The damper 14c is in the form of a hydraulic damper and has a substantially hollow-cylindrical inner housing 83 and an outer housing surrounding the inner housing 83, which outer housing forms the housing 15 of the damper 14c. According to the embodiment example shown, the two housings 83 are formed as tubular portions. The damper 14c is referred to as a two-tube damper.

Figures 23, 24:
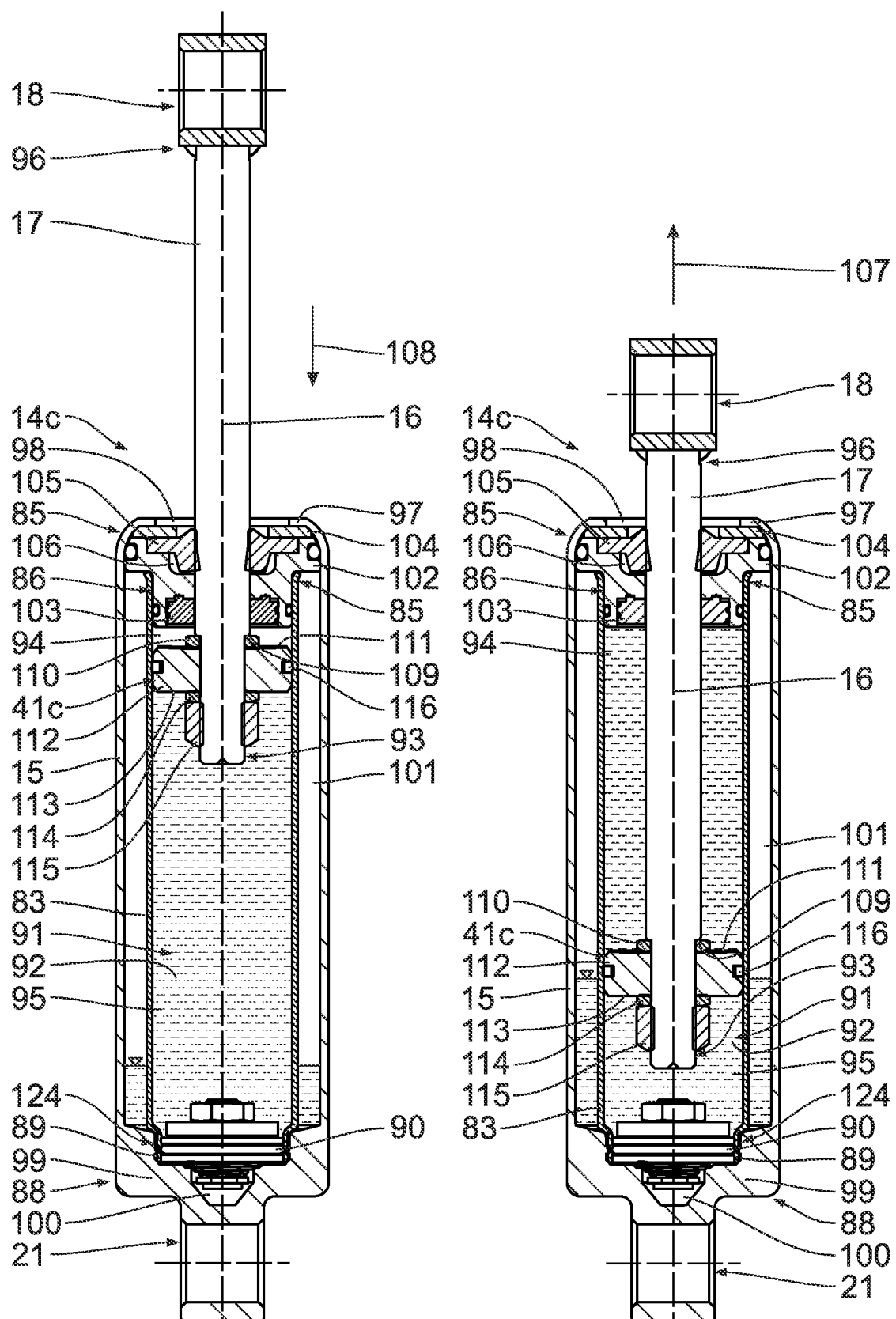
Figure 26:
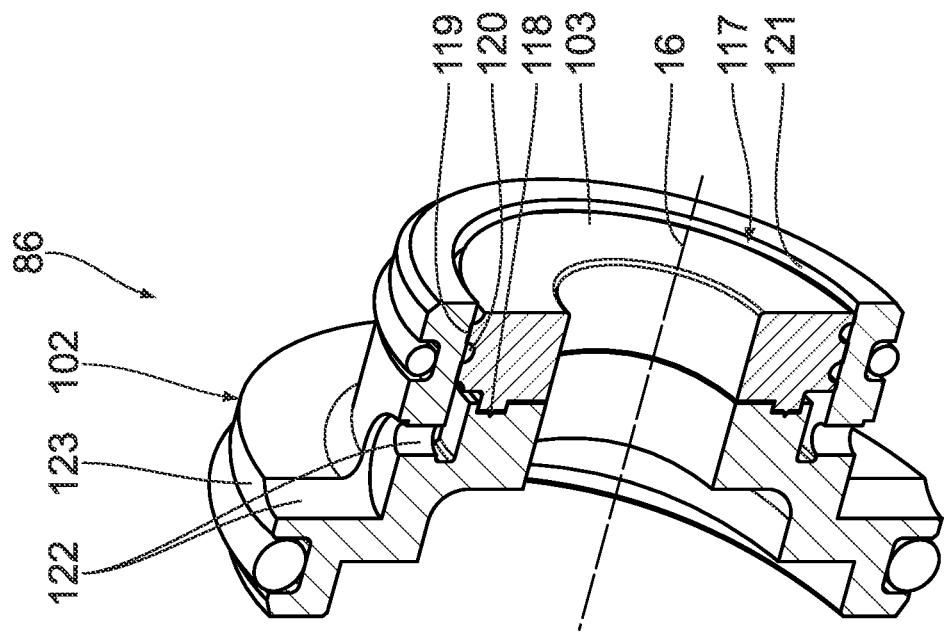
FIG. 26 shows a semi-cutaway, perspective illustration of the guiding and sealing unit according to FIG. 25.
Figure 25:
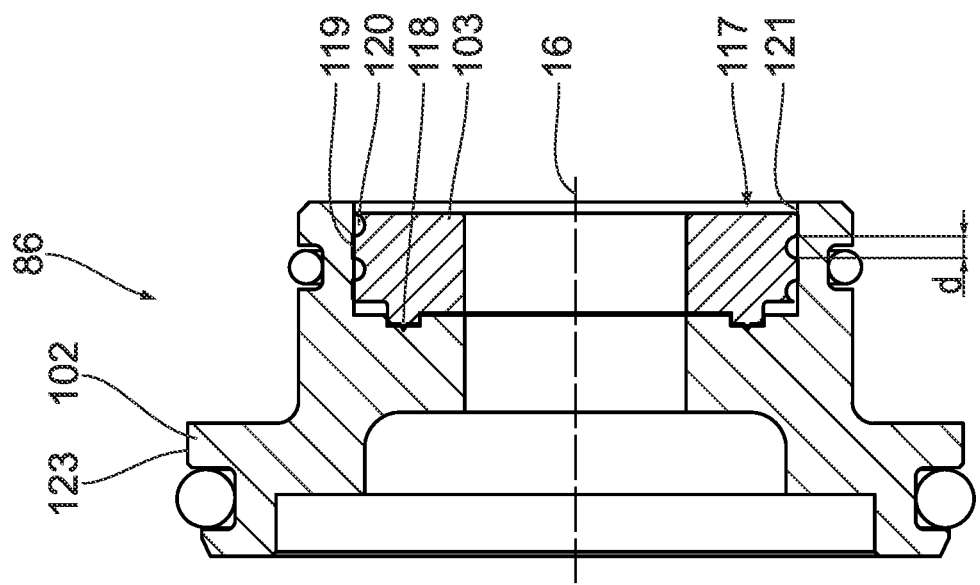
FIG. 25 shows an enlarged detailed view of a guiding and sealing unit of the damper in FIG. 23.
Figure 27:
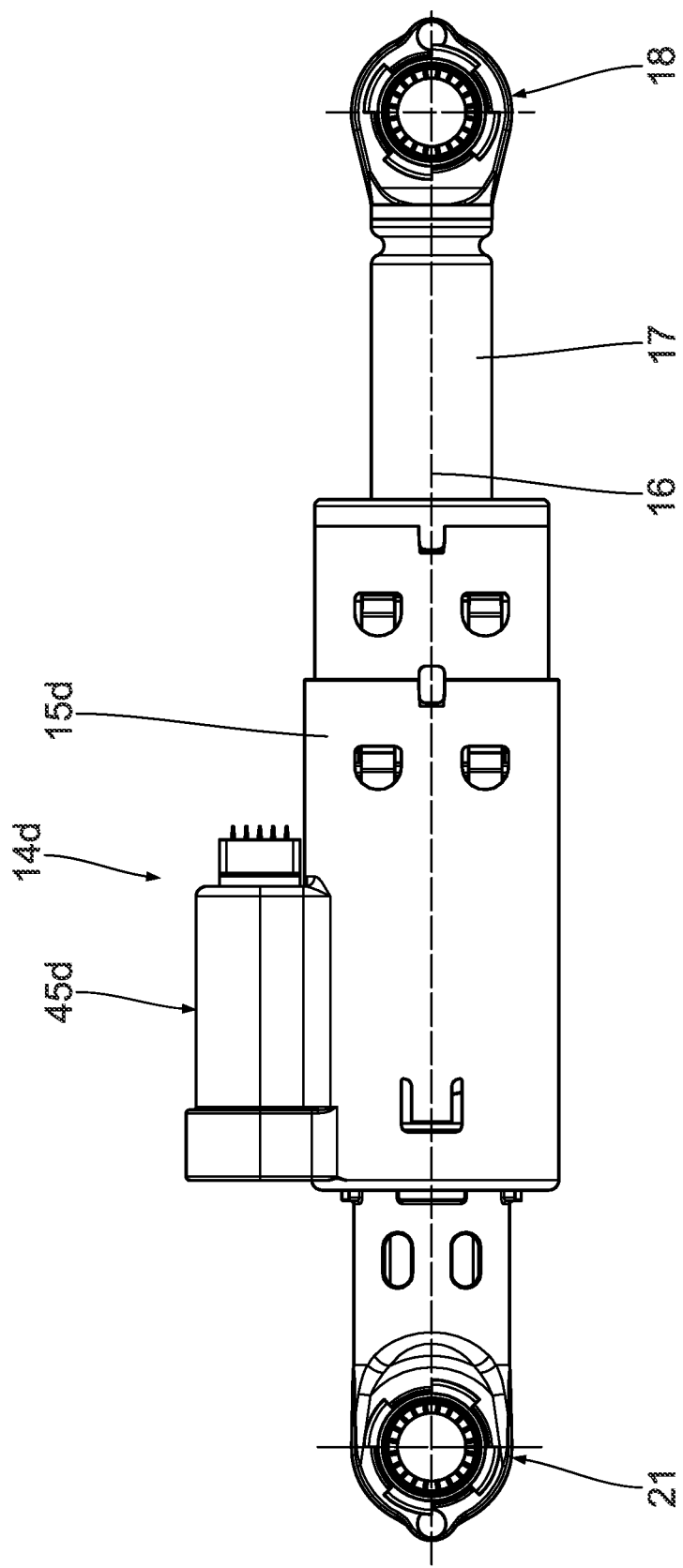
FIG. 27 shows a side view of a damper having axially displaceable freewheel stops according to a further embodiment.
Figure 28:
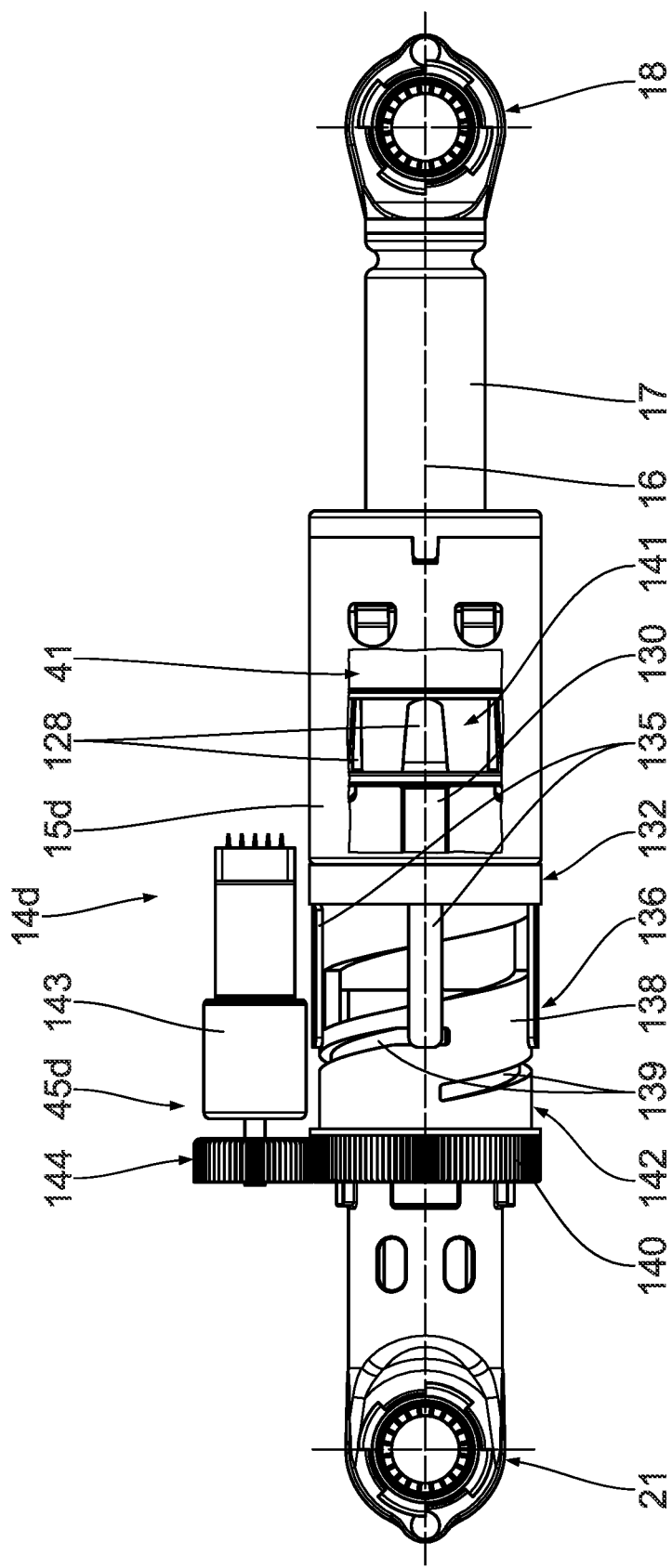
FIG. 28 shows an illustration corresponding to FIG. 27 of the damper in partially exposed form.

The inner housing 83 is closed at a first housing end 85, shown on the left in FIG. 23, by a guiding and sealing unit 86 for guiding and sealing a piston rod extending out of the first housing end 85. The piston rod forms the plunger 17. At a second housing end 88 opposite the first housing end 85, the inner housing 83 is closed by an annular housing cover 89 having a bottom valve 90. The inner housing 83, the guiding and sealing unit 86, and the housing cover 89 substantially enclose a working space 91 that is filled with a damping fluid 92. Concentrically with a central longitudinal axis 16, a piston 41c is disposed in the inner housing 83 and slidably guided along the central longitudinal axis, the piston 41c being attached to a first piston rod end 93. The piston 41c divides the working space 91 into a first partial working space 94 facing the first housing end 85 and a second partial working space 95 facing the second housing end 88. A first fastening member 18 in the form of a cylindrical through opening is integrally formed on a second piston rod end 96 arranged outside the damper 1.

The outer housing has a circular cross-section and surrounds the inner housing 83. A first housing end 85 is flanged to form a housing stop 97, wherein a housing opening 98 is defined through which the piston rod is guided. A second housing end 88 of the outer housing opposite the first housing end 85 is closed by a housing bottom 99 formed integrally with the outer housing. The housing bottom 99 may also be connected to the outer housing as a separate and, in particular, multi-part component. On the side facing the inner housing 83, the housing bottom 99 is provided with, for example, a step-shaped housing bottom recess 100 for receiving the bottom valve 90. A second fastening member 21 is formed or attached to a side of the housing bottom 99 facing away from the inner housing 83, wherein the second fastening member 21 is aligned substantially centrally with respect to the central longitudinal axis 16. The inner housing 83 and the outer housing are arranged concentrically with respect to the central longitudinal axis 16, so that a compensation space 101 is formed in the shape of an annular gap. The compensation space 101 has a constant width along its circumference. It is also possible for the damper 14c to comprise at least one housing having a non-circular, substantially oval cross-section which is arranged offset from the other housing 83 such that the compensation space 101 is formed in the shape of an annular gap having an oval cross-section. The compensation space 101 may further extend into the housing bottom recess 100. The compensation space 101 may be pressurized and is partially filled with the damping fluid 92, for example oil, gas such as nitrogen.

For fastening the inner housing 83 in the outer housing in the region of the first housing ends 85, 88, the guiding and sealing unit 86 has a guiding housing 102 and a guiding cover 103. The guiding cover 103 is arranged in a recess provided for this purpose in the guiding housing 102. The guiding housing 102 is step-shaped along the central longitudinal axis 16 and is arranged with an inner housing step sealed in the inner housing 83. With an outer housing step, the guiding housing 102 is circumferentially sealed to the outer housing and supported along the central longitudinal axis 16 by a washer 104 on the housing stop 97. At an end face facing the first housing end 85 of the outer housing, the guiding housing 102 has a recess into which a sealing member 105 is inserted. The sealing member 105 serves to guide the piston rod out of the damper 14c in a sealed manner. The recess in the guiding housing 102 is selected to be larger than the sealing member 105 arranged therein, so that a pressure chamber 106 is defined by the guiding and sealing unit 86, the sealing member 105 and the piston rod.

It is additionally possible to provide a valve ring, not shown, between the guiding housing 102 and the guiding cover 103. The valve ring prevents a fluid flow from the working space 91 into the pressure chamber 106, particularly when the piston rod moves in a pull-out direction 107. When the piston rod moves in a push-in direction 108, a fluid flow from the working space 91 into the pressure chamber 106 can be tolerated.

The guiding housing 102 has a shoulder 124 on which the inner housing 83 is supported in the axial direction, i.e. along the central longitudinal axis 16. In the region of the second housing ends 88, the inner housing 83 is fastened to the outer housing by the housing cover 89, which is annular in shape and rests against the second housing end 88 with a housing cover stop projecting in the radial direction beyond the inner housing 83. For receiving the bottom valve 90, the housing cover 89 has a housing cover bore arranged concentrically to the central longitudinal axis 16 which merges into an annular housing cover recess. The bottom valve 90 allows a fluid flow from the compensation space 101 into the working space 91 and, in particular, into the second partial working space 95.

The piston rod has a reduced diameter at its first piston rod end 93, whereby a piston rod stop 109 is formed. Starting from the piston rod stop 109, a first piston rod spacer disc 110, a first closing member 111 in the form of a disc spring, a piston disc 112, a second closing member 113 in the form of a disk spring, a second piston rod spacer disc 114 and a piston rod lock nut 115 are arranged on the first piston rod end 93. The piston rod lock nut 115 is screwed onto a piston rod thread and secures the piston 41c on the piston rod. The piston 41c is formed by the first closing member 111, the piston disc 112, the second closing member 113, and a piston seal 116. The piston seal 116 is annular in shape and is arranged in a piston groove provided for this purpose in the piston disc 112. The piston groove is formed in an outer wall of the piston disc 112 facing the inner housing 83. The piston seal 116 seals the piston disc 112 against the inner housing 83.

The first closing member 111 is effective when the piston rod moves in the push-in direction 108 and is referred to below as a compression disc spring. The second closing member 113 is effective in the pull-out direction 107 and is referred to below as a tension disc spring. The tension disc spring 113 cooperates with a plurality of traction through flow channels, not shown, and the compression disc spring 111 cooperates with a plurality of pressure through flow channels, not shown. The through flow channels each include a transverse channel extending transversely to the central longitudinal axis 16, and a longitudinal channel connected to the transverse channel and extending along the central longitudinal axis 16. The through flow channels are formed in the piston disc 112 and provide a connection between the first partial working space 94 and the second partial working space 95. As viewed in the push-in direction 108, the traction through flow channels may be configured from the longitudinal channel and the adjoining transverse channel. In contrast, the traction through flow channels may be configured by the transverse channel and the longitudinal channel adjoining it. The longitudinal channels of the traction through flow channels can be arranged in the piston disc 112 in such a way that they can be closed by the elastically deformable tension disc spring 113. Correspondingly, the longitudinal channels of the pressure flow-through channels can be arranged in the piston disc 112 in such a way that they can be closed by the elastically deformable compression disc spring 111. When the piston 41c is moved in the pull-out direction 107 or in the push-in direction 108, the through flow channels can each have an effective flow cross-sectional area which can be varied by closing individual or several through-flow channels. The effective flow cross-sectional area is understood to mean a cross-sectional area of the through flow channels effective for the damping force-velocity characteristic of the damper 14c, wherein the cross-sectional area of the through flow channels along thereof may be arbitrary. Thus, the effective flow cross-sectional area is to be understood as a resulting cross-sectional area of the flow-through channels.

The damper 14c has a preferred mounting position such that the push-in direction 108 is identical to the direction of gravity. The damper 14c is mounted to an element to be damped in such a manner that the piston rod is fastened to the moving part to be damped by the first fastening member 18. This means that the damper 14c is substantially vertically aligned with its central longitudinal axis 16, wherein in this mounting position the piston rod with the first fastening member 18 is arranged at the top.

The guiding and sealing unit 86 is arranged in the housings 83, 84 of the damper 14c in such a manner that the guiding cover 103 faces the working space 91. The guiding cover 103 is arranged in a recess 117 of the guiding housing 102 provided for this purpose. The guiding cover 103 is arranged with an end face, projecting ring elevation 118 and a groove of the guiding housing 102 provided therefor. As a result, the guiding cover 103 and the guiding housing 102 are positioned relative to each other and, in particular, are arranged concentrically with respect to the central longitudinal axis 16. An outer cylinder jacket surface 119 of the guiding cover 103 is provided with an outer groove which extends along the central longitudinal axis 16 in the form of a helix. Accordingly, the outer cylinder jacket surface 119 of the guiding cover 103 only in portions rests against an inner cylinder jacket surface 121 of the guiding housing 102. The outer groove 120 allows a fluid flow along a helix at an outer periphery of the guiding cover 103 to a distributor channel 122. The distributor channel 122 is substantially integrated in a stepped manner into the guiding housing 102 and connects the outer groove 120 to the shoulder 124, wherein the distributor channel 122 extends to an outer jacket surface 123 of the outer housing portion of the guiding housing 102. This ensures that the damping fluid 92 can flow from the working space 91 along the outer groove 120, via the distributor channel 122, into the compensation space 101 disposed between the inner housing 83 and the outer housing. By virtue of the fact that the distributor channel 122 is recessed with respect to the shoulder against which the inner housing 83 is supported, said fluid flow is ensured. The outer groove 120 is also referred to as a throttle channel and, according to the first embodiment example, has a semicircular flow cross-sectional area having a clear width d and a length. In said embodiment example, the clear width d is the diameter of the semicircle. According to the embodiment example shown in FIG. 25 and FIG. 26, the throttle channel 120 at the outer cylinder jacket surface 119 of the guiding cover 103 is designed as a full circumferential helix, i.e. with an opening angle of 360°. This means that the pitch of the helix corresponds to the width of the guiding cover 103. The helical throttle channel 120 may also have an opening angle different from 360°. An opening angle of both less than 360° and greater than 360° is possible. The pitch of the helix may be different from the width of the guiding cover 103. It is possible by changing the width of the guiding cover 103, i.e. by changing the dimension of the guiding cover 103 along the central longitudinal axis 16 also to adjust the length of the throttle channel 120. The length 1 of the throttle channel 120 is greater than the clear width d of the throttle channel. It is also possible to select other cross-sectional shapes for the throttle channel 120 such as a circular shape or rectangular shape. The throttle channel 120 may also have a meandering shape or other arrangement around the central longitudinal axis 16. It is possible to provide at least one throttle check valve in the throttle channel 120 to prevent a fluid flow from the compensation space 101 into the working space 91.

The function of the damper 14c is described hereinafter. The piston 41c has through flow channels that can be closed by disc springs 111, 113. When the damper is at rest, the disc springs 111, 113 are in contact with the piston, i.e. the through flow channels are closed. When the piston rod is actuated, the fluid pressure on the disc springs 111, 113 increases while the insertion or extraction speed rises, in particular until a switching pressure is reached in one of the partial working spaces 94, 95. When this switching pressure has been reached, the corresponding disc spring 111, 113 lifts off the piston. The fluid flow between the two partial working spaces 94, 95 is unimpeded along the through flow channels of the piston 41c. This applies when the piston 41c is actuated in both the pull-out direction 107 and the push-in direction 108. A damper 14c of this type has a non-progressive damping behavior. The damping force-velocity characteristic is given by the effective flow cross-sectional area of the through flow channels.

It is also possible to implement the damper 14c as a so-called progressive damper, the functional principle of which is explained below. FIGS. 23 and 24 show the non-operating state of damper 14c. The disc springs 111, 113 do not rest against the associated contact surfaces and the through flow channels are not closed. When the piston 41c is moved in the pull-out direction 107 or in the push-in direction 108 at low speed, the piston 41c, in particular the disc springs 111, 113 remain substantially in the non-operating state shown in FIGS. 23, 24. The damping fluid 92 can flow through the through flow channels when the piston 41c moves. The disc springs 111, 113 leave a sufficient gap between themselves and the associated contact surfaces to allow the damping fluid 92 to enter the respective other partial working space 94, 95. In the progressive damper 14c, the mode of action of the disc springs 111, 113 is reversed with respect to the non-progressive damper 14c, i.e., the disc spring 111 acts as a tension disc spring and the disc spring 113 acts as a compression disc spring. The damping force-velocity characteristic is given at low velocity by the effective flow cross-sectional area of the through flow channels.

In the following, based on FIG. 23, the function of the progressive damper 14c is described when the piston 41c moves in the push-in direction 108, the push-in speed being much higher compared to the movement of the piston 41c described above. During a movement of the piston 41c, a force is exerted on the compression disc spring 113 by the damping fluid 92 located in the second partial working space 95. As the force increases, the compression disc spring 113 is increasingly elastically deformed and pressed against the associated contact surfaces of the through flow channels, progressively reducing the effective flow cross-sectional area. When a sufficient force is applied, the compression disc spring 113 rests fully against the contact surfaces so that the through flow channels are completely closed. In this case, the damping fluid 92 can only flow through the through flow channels from the second partial working space 95 into the first partial working space 94. This forces the tension disc spring 111 away from the associated contact surfaces, allowing said fluid flow from the second partial working space 95 into the first partial working space 94.

The volume of the damping fluid 92 displaced by the piston rod flows into the compensation space 101 via the throttle channel 120 and the distributor channel 122. Due to the fact that the flow cross-section of the throttle channel 120 is reduced compared to the annular cross-section in the first partial working space 94, the damping fluid 92 is throttled along the throttle channel 120. Thus, the throttle channel 120 is substantially independent of manufacturing tolerances of the piston rod and a guiding bore through which the piston rod is guided in the guiding and sealing unit 86. Further, dimensional variations in the manufacture of the throttle channel 120 are not critical to the damping effect of the damper 14c, since the damping function depends on the volume flow of the damping fluid 92 flowing through the throttle channel 120. Said damping effect is significantly influenced by the length of the throttle channel 120, which is greater than the clear width d of the throttle channel 120. In particular, the guiding and sealing unit 86 allows a flow through the annular gap between the piston rod and the guiding bore not to affect the damping effect of the damper 14c.

A change in the throttle performance and thus the damping effect of the damper 14c can be achieved directly and straightforwardly by changing the length of the throttle channel 120, for example by changing the width of the guiding cover 103, i.e. its extension along the central longitudinal axis 16.

It is also possible to tolerate flow through the annular gap. In this case, a small portion of the damping fluid 92 flows into the pressure chamber 106. For this purpose, a valve ring, which is not shown, can be provided to prevent the damping fluid 92 from entering the pressure chamber 106 unthrottled, where it acts on the sealing member 105 with fluid pressure pr. This can increase the service life of the sealing member 105. A vent opening, not shown, may also be provided in the pressure chamber 106 to allow venting of the pressure chamber 106 at a minimum venting pressure $p_e$. The venting pressure $p_e$ is greater than the fluid pressure $p_f$.

When the piston rod is actuated starting from the arrangement in FIG. 24 along the pull-out direction 107, the damping fluid 92 is displaced from the first partial working space 94 by the piston 41c and flows at the first housing end 85 via the throttle channel 120 and the distributor channel 122 into the compensation space 101. This means that the damping fluid 92 also passes through the throttle channel 120 when the damper 14c is actuated in the pull-out direction 107. At the second housing end 88, the damping fluid 92 is sucked into the second partial working space 95 via the bottom valve 90 of the inner housing 83. Additionally, it is possible for fluid to flow directly from the first partial working space 94 into the second partial working space 95 through the through openings in the piston disc 112.

The throttle channel 120 is part of a throttle valve, which in particular is variably adjustable. In particular, the length and/or the cross-sectional area of the throttle channel 120 are variably adjustable.

In another embodiment, the throttle channel 120 may be formed as an inner groove on the inner cylinder jacket surface 121 of the guiding housing 102. In contrast, the outer cylinder jacket surface 119 of the guiding cover 103 may be designed without a groove. It is also conceivable that both cylinder jacket surfaces 119, 121 are designed with a groove.

According to yet another embodiment, the throttle channel 120 may be integrally formed as an outer groove on an outer cylinder jacket surface 119 of the guiding housing 102. Accordingly, the inner housing portion of the guiding housing 102 may not include a recess for a guiding cover 103.

According to a further embodiment, the throttle channel 120 may be spirally arranged on an end face of the guiding cover 103 facing the guiding housing 102 and/or on an end face of the guiding housing 102.

In the following, a fifth embodiment of the invention is described with reference to FIGS. 27 to 32. Constructively identical parts are given the same reference numerals as in the previous embodiments, to the description of which reference is hereby made. Constructively different but functionally similar parts are given the same reference numerals with a trailing letter d.

The active damper 14d differs from the previous embodiments in that at least one stop member 128 is provided for axial displaceability of the friction lining, which stop member 128 is displaceable along the longitudinal axis 16 of the damper 14d. The stop member 128 is also referred to as a freewheel stop. Due to the axial displaceability of the at least one stop member 128, the damper 14d has a variably adjustable freewheel length.

As in the damper according to the first embodiment, the friction lining is accommodated in a piston 41 which is axially displaceable in the housing 15d. In order for the friction unit with the friction lining to be able to strike axially against the stop members 128, the friction lining is exposed in the axial direction at least in some regions. This means that in this region the friction lining is not covered by the piston 41. The at least one stop member 128 can contact the friction lining immediately, i.e. directly, when the piston 41 is displaced accordingly. The friction lining is in frictional contact with the outer surface of the plunger 17. With respect to the basic freewheel function, reference is made to the first embodiment.

In the embodiment shown, the damper 14d has four stop members 128 held along a ring 129 and arranged along the circumferential line thereof. According to the embodiment shown, the stop members 128 are equally spaced in the circumferential direction, i.e., arranged at a 90° rotational angular offset with respect to the longitudinal axis 16. Fewer or more than four stop members 128 may also be arranged. The stop members 128 can be arranged at equal or different distances from one another in the circumferential direction on the ring 129.

According to the embodiment shown, the stop members 128 have different lengths 11, 12. In particular, the lengths 11, 12 of the stop members 128 arranged diametrically opposite one another are identical. This makes it possible for not all stop members 128 to make contact with or penetrate the friction lining at the same time, but with a time offset, when the friction lining strikes the stop members 128.

The ring 129 is axially fixed to an adjustment member 132 via axial webs 130 and a radially outwardly projecting annular collar 131. The stop members 128, the ring 129, the axial webs 130 and the annular collar 131 form a stop unit 141.

For this purpose, the adjustment member 132 has an inner groove 133 corresponding to the annular collar 131. The adjustment member 132 essentially has an outer ring 134 in which the inner groove 133 is arranged. At least one guiding web 135 is integrally formed on the outer ring 134. According to the embodiment shown, four guiding webs 135 are provided on the outer ring 134. More or fewer than four guiding webs 135 may also be provided. The guiding webs 135 extend parallel to the longitudinal axis 16 and are arranged in a plane perpendicular to the longitudinal axis 16 on a circular line, in particular equally spaced apart in the circumferential direction. The guiding webs 135 extend starting from the outer ring 134 in a direction opposite to the stop members 128.

In each case at their free end 136, which is arranged facing away from the outer ring 134, the guiding webs 135 have a radially inwardly directed guiding pin 137.

The damper 14d further includes a displacement member 138. The displacement member 138 is substantially sleeve-shaped. At least one guiding track 139 is arranged on the outside of the displacement member 138. According to the embodiment shown, the guiding track 139 is configured as an external groove in the displacement member 138. The guiding track 139 is designed in a helical shape along the outer circumference of the displacement member 138. According to the embodiment shown, four guiding tracks 139 are provided.

A guiding pin 137 of a guiding web 135 is arranged in each guiding track 139 and guided therein. The guiding webs 135 encompass the displacement member 138 from the outside. Due to the fact that the guiding webs 135 are arranged with the guiding pins 137 in the guiding tracks 139, the adjustment member 132 is held axially on the displacement member 138.

At a free end facing away from the adjustment member 132, the displacement member 138 has a force transmission member 140 which, according to the embodiment shown, is designed as an external toothing.

The stop unit 141, the adjustment member 132, and the displacement member 138 form an adjustment mechanism 142. The adjustment mechanism 142 serves to adjust the stop members 128 axially along the longitudinal axis 16. The axial adjustment of the stop members 128 variably adjusts the freewheel, or idle stroke, of the friction lining in the friction damper 14d.

Interacting with the displacement member 138 is a switching drive 45d, which is coupled to a gearing mechanism 143 and a further force transmission member 144. The further power transmission member 144 meshes with the power transmission member 140.

The axial adjustability of the stop members 128 is explained in more detail below with reference to FIGS. 29 to 32. The adjustment mechanism 142 is arranged on the damper 14d fixed to the housing, i.e. axially fixed with respect to the longitudinal axis 16. When the switching drive 45d, which is configured in particular as an electric motor, is actuated, a rotary movement is transmitted from the further force transmission member 144 to the force transmission member 140. The rotary movement of the force transmission member 140, which is arranged in one piece on the displacement member 138, guides the guiding pins 137 and thus the guiding webs 135 in the guiding tracks 139. Due to the helical design of the guiding tracks 139, an axial displacement of the displacement member 132 and thus of the stop unit 141 takes place-depending on the direction of rotation. The axial displacement is thus directed away from the force transmission member 140 or directed towards the force transmission member 140, depending on the direction of rotation of the force transmission member 140. As a result, the axial position of the stop members 128 in the housing 15 of the friction damper 14d can be variably adjusted and, in particular, defined.

Figure 29:
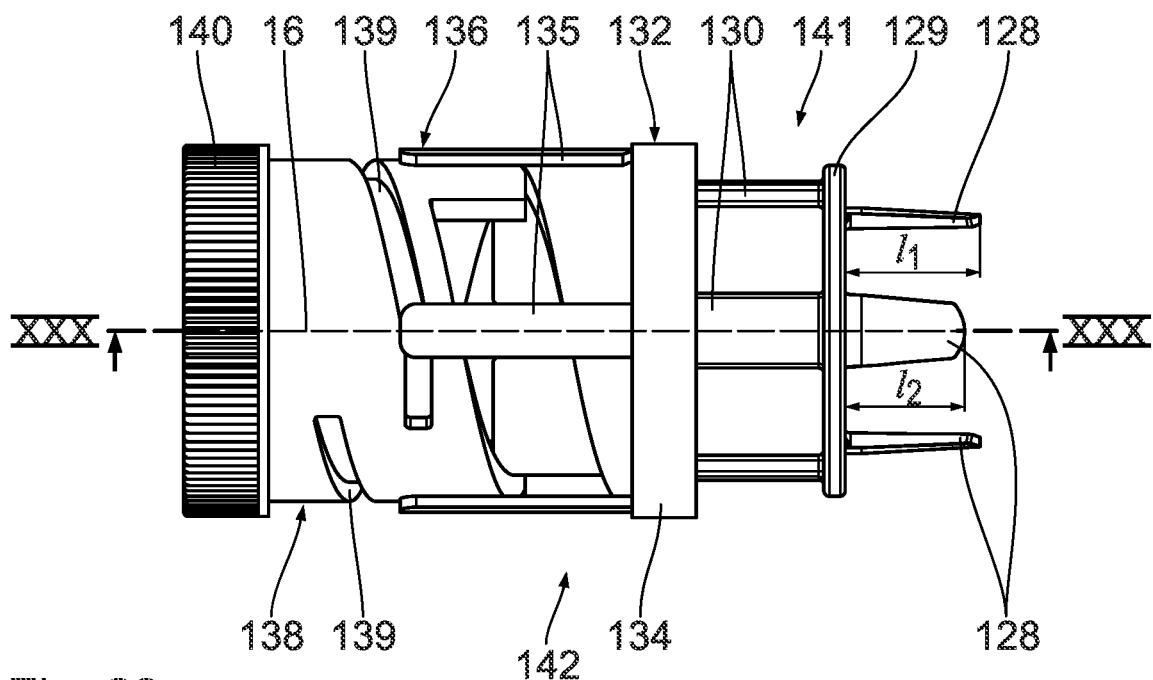
FIG. 29 shows a side view of an adjustment mechanism of the damper according to FIG. 27, wherein the freewheel stops are arranged in an extended position.
Figure 30:
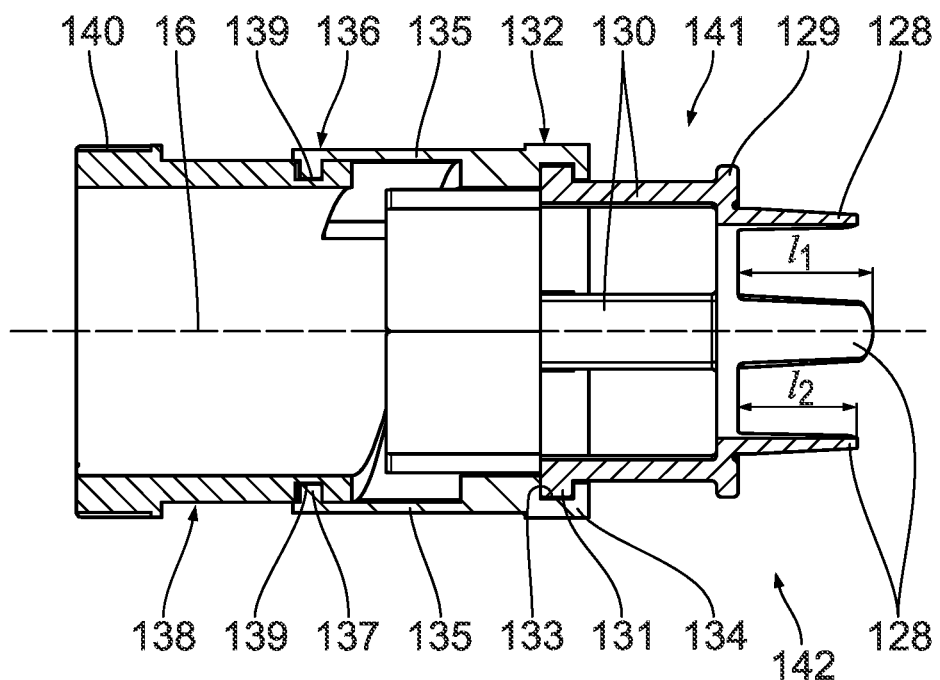
FIG. 30 shows a sectional illustration according to section line XXX-XXX in FIG. 29.
Figure 31:
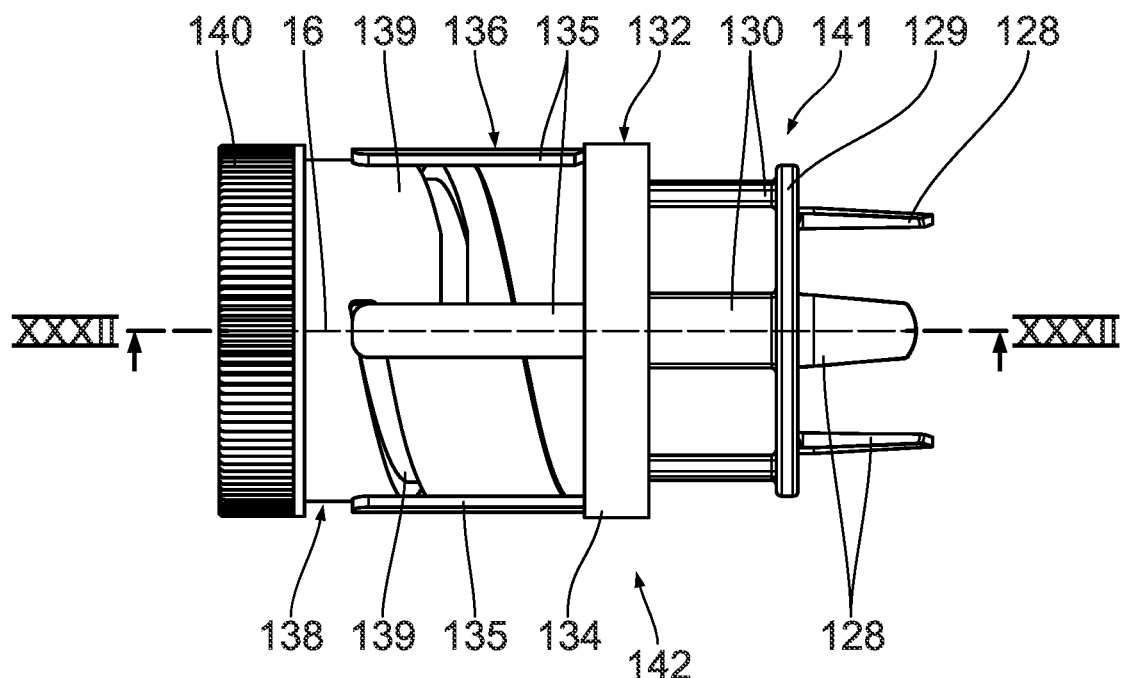
FIG. 31 shows an illustration corresponding to FIG. 29, wherein the freewheel stops are arranged in a retracted position.
Figure 32:
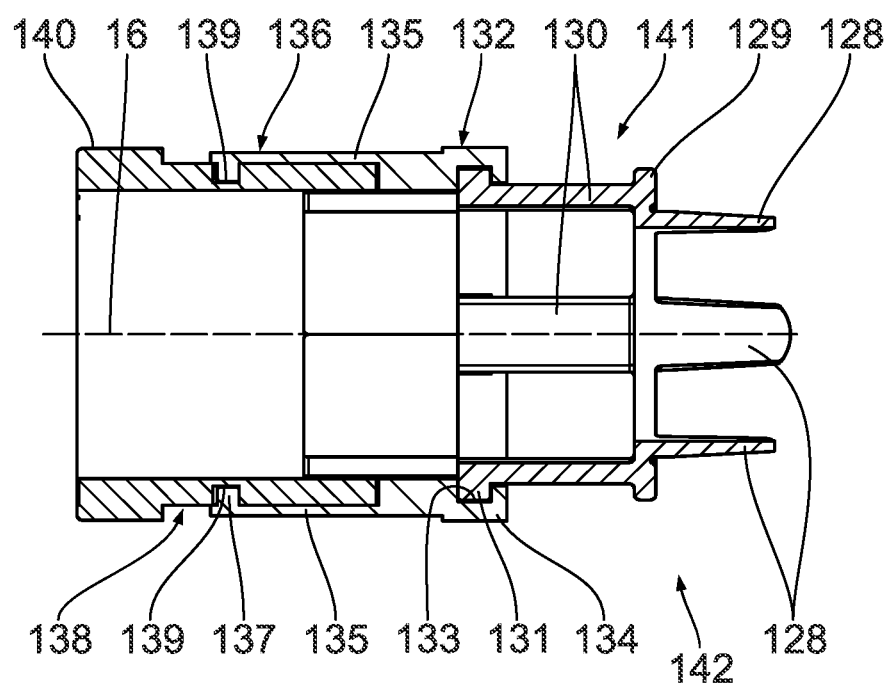
FIG. 32 shows a sectional illustration according to section lines XXXII-XXXII in FIG. 31.

FIGS. 29 and 30 show the adjustment mechanism 142 in an extended position in which the damper 14d has a small, in particular a minimum, and in particular no freewheel. Correspondingly, FIGS. 31 and 32 show a retracted position of the adjustment mechanism 132. In this case, the friction lining has a larger, in particular a maximum, freewheel.

A damper assembly according to the invention can in particular be implemented with one or more dampers 14, 14a, 14b, 14c of the embodiment examples explained above. In particular, it is conceivable that different damper types 14, 14a, 14b, 14c are combined in a damper assembly and integrated in a washing machine 1.

The invention claimed is:

1. A damper assembly comprising:
at least one damper, which causes a damping effect, said at least one damper being arranged between two components of a washing machine that are movable relative to one another, and each being connected thereto;
a regulation unit regulating the damping effect of the damper, said regulation unit being in signal communication with the damper; and
at least one determination unit determining at least one input variable, said at least one determination unit being in signal communication with the regulation unit, wherein the regulation unit transmits a regulation signal to the damper in dependence on the at least one input variable, and wherein the damper variably determines its damping effect in dependence on the regulation signal, wherein the damper is a friction damper comprising at least one friction lining being arranged axially moveable, wherein a limitation of said axial movability of said at least one friction lining is variably adjusted.

2. The damper assembly according to claim 1, wherein a friction unit is variably adjustable for generating a variably adjustable friction force.

3. The damper assembly according to claim 1, wherein the damper is a hydraulic damper.

4. The damper assembly according to claim 3, wherein the hydraulic damper has a variably adjustable throttle valve.

5. The damper assembly according to claim 1, wherein the at least one determination unit has at least one sensor for determining a vibration behavior of the components that are movable relative to one another, said sensor being arranged externally of the damper.

6. The damper assembly according to claim 1, wherein the at least one determination unit s in signal communication with a drive motor, which can drive at least one of the components that are movable relative to one another, for determining a characteristic variable.

7. The damper assembly according to claim 6, wherein the characteristic variable is at least one of the group comprising the performance, the current and the rotational speed of the drive motor.

8. The damper assembly according to claim 1, wherein the at least one damper has a transport securing device, which is formed by fixing a minimum damping effect and/or which has a locking member in order to lock the mobility of the damper.

9. The damper assembly according to claim 8, wherein the transport securing device is integrated in the at least one damper.

10. The damper assembly according to claim 8, wherein the transport securing device comprises a fixed minimum damping effect.

11. The damper assembly according to claim 8, wherein the transport securing device has a locking member locking the mobility of the damper.

12. The damper assembly according to claim 1, comprising an emergency power unit for providing power in an emergency condition.

13. The damper assembly according to claim 1, wherein the damper assembly is used in a washing machine.

14. The damper assembly according to claim 1, wherein the friction damper has a housing, a plunger that is displaceable relative thereto and/or a friction unit for generating a friction force.

15. The damper assembly according to claim 1, wherein the axial limitation of the at least one friction lining is provided by means of at least one axially displaceable freewheel stop element.

16. The damper assembly according to claim 15, wherein the at least one freewheel stop element is driven by an electric motor.

17. The damper assembly according to claim 1, further comprising at least one axially displaceable freewheel stop element, the at least one axially displaceable freewheel stop element being configured to limit axial movement of the at least one friction lining.

18. The damper assembly according to claim 17, wherein the at least one freewheel stop element is configured to be actuated via an electric motor.

19. A damper assembly comprising:
at least one damper, which causes a damping effect, said at least one damper being arranged between two components of a washing machine that are movable relative to one another, and each being connected thereto;
a regulation unit regulating the damping effect of the damper, said regulation unit being in signal communication with the damper; and
at least one determination unit determining at least one input variable, said at least one determination unit being in signal communication with the regulation, wherein the regulation unit transmits a regulation signal to the damper in dependence on the at least one input variable, and wherein the damper variably determines its damping effect in dependence on the regulation signal, wherein the at least one determination unit has at least one sensor integrated in the damper, for determining at least one of the group comprising a movement of at least one damper component and the occurring forces of at least one damper component.

20. The damper assembly according to claim 19, wherein the damper component is a housing, a plunger that is displaceable relative thereto and/or a friction unit.

21. A washing machine, comprising:
a housing being a first component of two components;
a washing tub, which is mounted in the housing such as to oscillate, wherein the washing tub is displaceable relative to the first housing; and
a damper assembly comprising at least one damper, which causes a damping effect, said at least one damper being arranged between two components of a washing machine that are movable relative to one another, and each being connected thereto;
a regulation unit regulating the damping effect of the damper, said regulation unit being in signal communication with the damper; and
at least one determination unit determining at least one input variable, said at least one determination unit being in signal communication with the regulation, wherein the regulation unit transmits a regulation signal to the damper in dependence on the at least one input variable, and wherein the damper variably determines its damping effect in dependence on the regulation signal, wherein the at least one damper is connected to the housing and to the washing machine, wherein the at least one damper is fastened with a first end to an upper side facing a cover element of the housing and with a second end to the cover element.

22. The machine according to claim 21, wherein the at least one damper is fastened with a first end to a bottom side facing a bottom element of the housing and with a second end to at least one of the bottom element and a side element that is adjacent to the bottom element.

23. The machine according to claim 21, wherein the at least one damper is fastened with a first end to an outer side of the washing tub oriented parallel to one of the axis of rotation of the laundry drum and to an end face of the washing tub oriented perpendicular to the axis of rotation of the laundry drum.

24. The machine according to claim 21, wherein the damper assembly has two dampers.

25. The machine according to claim 24, wherein the dampers are arranged at a distance from one another along a longitudinal direction oriented parallel to the axis of rotation of a laundry drum.

26. The machine according to claim 24, wherein the dampers are arranged at a distance from one another in the circumferential direction with respect to the axis of rotation of a laundry drum.

27. The machine according to claim 24, wherein at least one damper is an active damper.

28. The machine according to claim 21, wherein the determination unit of the at least one damper is in signal communication with a sensor arranged externally with respect to the damper.

29. The machine according to claim 28, wherein the external sensor is an acceleration sensor, light barrier, force sensor, frequency sensor and/or displacement sensor.

30. The machine according to claim 21, wherein the machine is a washing machine.

31. The machine according to claim 21, wherein the first component is a housing.

32. The machine according to claim 21, wherein a laundry drum is arranged in the washing tub, which laundry drum is mounted such that it can rotate about an axis of rotation.

33. The machine according to claim 21, wherein the second component is rotatable about an axis of rotation.

* * * * *